United States Patent [19]

Swanson et al.

[11] Patent Number: 5,637,166

[45] Date of Patent: Jun. 10, 1997

[54] SIMILAR MATERIAL THERMAL TAB ATTACHMENT PROCESS FOR INK-JET PEN

[75] Inventors: David W. Swanson, Escondido; Winthrop D. Childers, San Diego; Jaren D. Marler, Escondido, all of Calif.

[73] Assignee: Hewlett-Packard Company, Palo Alto, Calif.

[21] Appl. No.: 317,518

[22] Filed: Oct. 4, 1994

[51] Int. Cl.$^6$ .................................................. B32B 31/16
[52] U.S. Cl. .......................... 156/73.1; 156/292; 156/293; 156/309.6; 264/445
[58] Field of Search ........................... 156/73.1, 221, 156/290, 292, 580.1, 580.2, 308.2, 309.6, 293; 264/23, 249, 442, 443, 445

[56] References Cited

U.S. PATENT DOCUMENTS

| | | | |
|---|---|---|---|
| 4,500,895 | 2/1985 | Buck et al. | 346/140 R |
| 4,600,927 | 7/1986 | Sugitani | 346/1.1 |
| 4,683,481 | 7/1987 | Johnson | 346/140 R |
| 4,859,378 | 8/1989 | Wolcott | 264/23 |
| 4,926,197 | 5/1990 | Childers et al. | 347/63 |
| 4,967,208 | 10/1990 | Childers | 347/56 |
| 5,189,787 | 3/1993 | Reed et al. | 29/831 |
| 5,198,834 | 3/1993 | Childers et al. | 346/1.1 |
| 5,278,584 | 1/1994 | Keefe et al. | 346/140 R |
| 5,297,331 | 3/1994 | Childers | 29/611 |
| 5,408,738 | 4/1995 | Schantz et al. | 29/611 |
| 5,420,627 | 5/1995 | Keefe et al. | 347/87 |
| 5,435,863 | 7/1995 | Frantz | 156/64 |
| 5,440,333 | 8/1995 | Sykora et al. | 347/87 |
| 5,442,384 | 8/1995 | Schantz et al. | 347/20 |
| 5,442,386 | 8/1995 | Childers et al. | 347/50 |
| 5,450,113 | 9/1995 | Childers et al. | 347/87 |
| 5,451,995 | 9/1995 | Swanson et al. | 347/87 |

FOREIGN PATENT DOCUMENTS 0561051  9/1993  European Pat. Off. ............ 347/87

OTHER PUBLICATIONS

Branson Sonic Power Company, "Ultrasonic Plastics Assembly", 1979, pp. 49–52.
Zerox Disclosure Journal, "Wire Bond Encapsulation Method For Full Width Semiconductor Arrays," vol. 17, No. 5, Sep./Oct. 1992, pp.305–308.
Hewlett–Packard Journal, vol. 36, No. 5, May 1985.
Hewlett–Packard Journal, vol. 39, No. 4, Aug. 1988.

*Primary Examiner*—James Sells

[57] ABSTRACT

A method of attaching a flexible interconnection circuit assembly to an ink-jet pen cartridge. The cartridge includes a frame structure fabricated of a rigid plastic frame member formed of a first plastic material and a polymeric second material molded to the frame member. A headland region is defined at the tip of a snout region of the cartridge. An ink reservoir is connected through a standpipe defined by the rigid frame material with the headland region. The second plastic material coats the headland region, and portions of flap and tab sides of the snout regions. The interconnection circuit assembly includes a thermoplastic cover layer, a flexible tab circuit and a printhead die and orifice plate affixed to the tab circuit. The interconnection assembly is attached to the headland region after alignment by heatstaking the polymeric second plastic material covering cheek areas of the headland region and areas of the flap and tab sides of the snout region to corresponding areas of the cover layer of the assembly. This results in a strong chemical bond securing the flexible interconnection circuit to the cartridge.

30 Claims, 15 Drawing Sheets

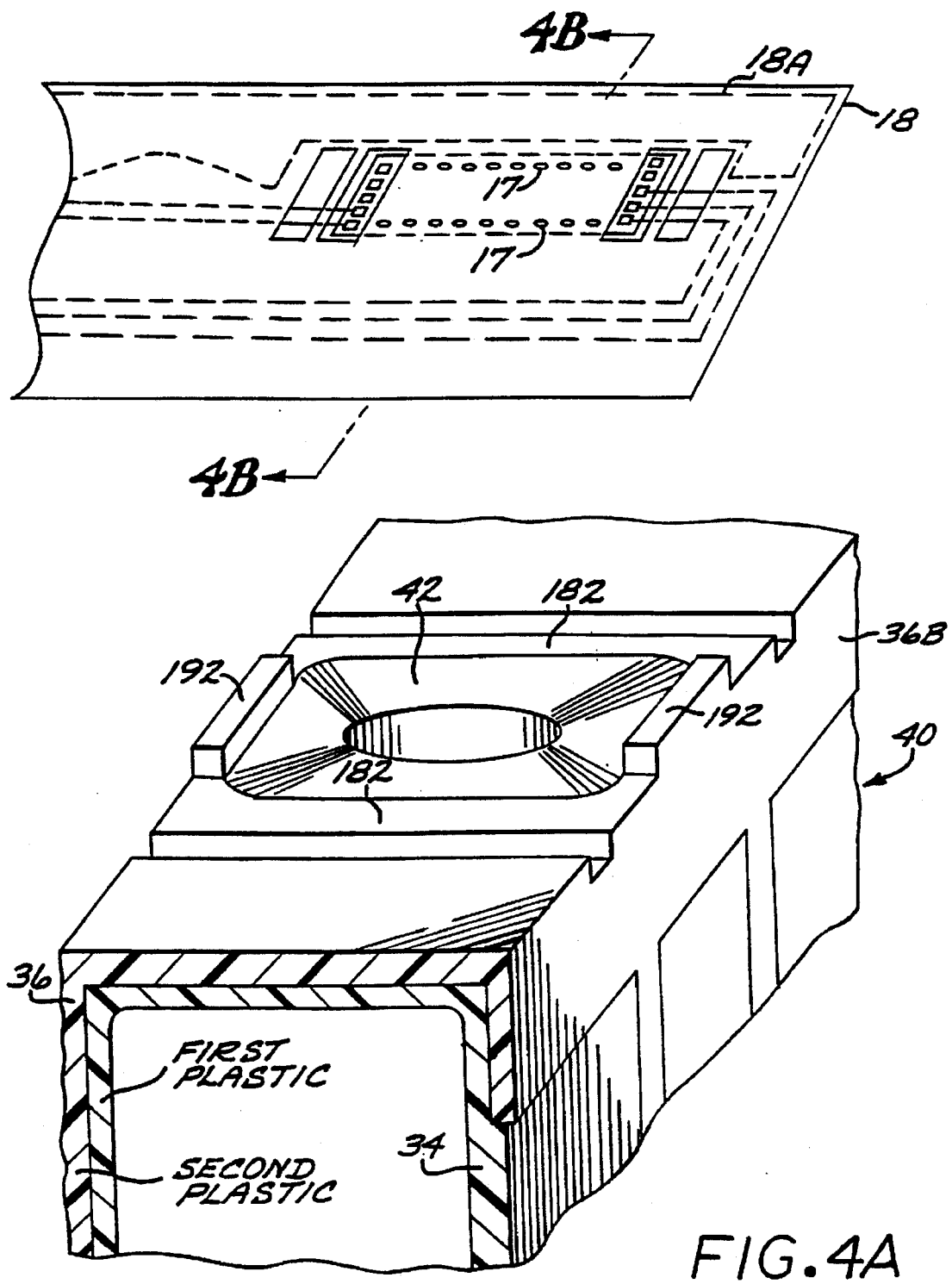

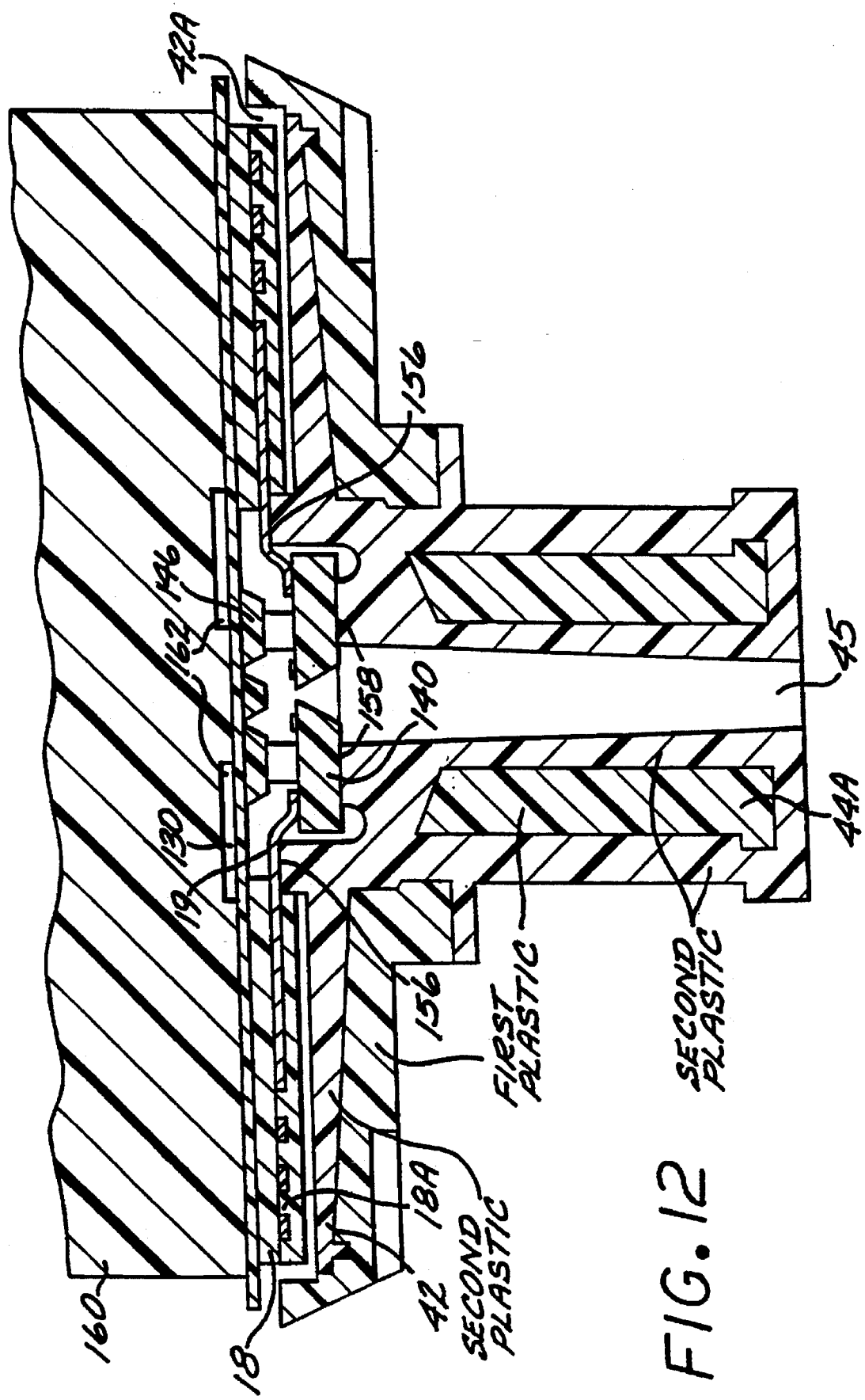

SIMILAR MATERIAL THERMAL TAB ATTACHMENT PROCESS FOR INK-JET PEN

RELATED INVENTIONS

This case is related to U.S. Pat. No. 5,450,113; Ser. No. 08/317,444, filed Oct. 4, 1994 entitled JOINTLESS TWO-MATERIAL FLAME DESIGN FOR THERMAL INK-JET PEN, by D. W. Swanson et al.; Ser. No. 08/317,519, filed Oct. 4, 1994 entitled ADHESIVELESS PRINTHEAD ATTACHMENT FOR INK-JET PEN, by D. W. Swanson et al.; Ser. No. 08/317,520, filed Oct. 4, 1994, U.S. Pat. No. 5,538,586, entitled ADHESIVELESS ENCAPSULATION OF TAB CIRCUIT TRACES FOR INK-JET PEN, by D. W. Swanson et al.; Ser. No. 08/317,517, filed Oct. 4, 1994, attorney docket number 1093213-1, entitled COMPLIANT HEADLAND DESIGN FOR THERMAL INK-JET PEN, by D. W. Swanson et al.; Ser. No. 08/082,198, filed Jun. 24, 1993, U.S. Pat. No. 5,500,660, entitled WIPER FOR INK-JET PRINTHEAD NOZZLE MEMBER, by W. D. Childers et al.; U.S. Pat. No. 5,420,627, entitled INKJET PRINTHEAD, by B. J. Keefe et al.; Ser. No. 08/131,808, filed Oct. 5, 1993, entitled RESTRAINING ELEMENT FOR A PRINT CARTRIDGE BODY TO REDUCE THERMALLY INDUCED STRESS, by J. D. Marler et al.; U.S. Pat. No. 5,442,384, entitled INTEGRATED NOZZLE MEMBER AND TAB CIRCUIT FOR INKJET PRINTHEAD, by C. A. Schantz et al.; U.S. Pat. No. 5,442,386, entitled STRUCTURE AND METHOD FOR PREVENTING INK SHORTING OF CONDUCTORS CONNECTED TO A PRINTHEAD, by W. D. Childers et al.; and Ser. No. 08/131,802, filed Oct. 5, 1993; U.S. Pat. No. 5,506,608, entitled PRINT CARTRIDGE BODY AND NOZZLE MEMBER HAVING SIMILAR COEFFICIENT OF EXPANSION, by W. D. Childers et al.

BACKGROUND OF THE INVENTION

TIJ technology is widely used in computer printers. Very generally, a TIJ includes a print head typically comprising several tiny controllable ink-jets, which are selectively activated to release a jet or spray of ink from an ink reservoir onto the print media (such as paper) in order to create an image or portion of an image. TIJ printers are described, for example, in the Hewlett-Packard Journal, Volume 36, Number 5, May, 1985, and Volume 39, Number 4, August, 1988.

Thermal ink-jet print cartridges operate by rapidly heating a small volume of ink to cause the ink to vaporize and be ejected through one of a plurality of orifices so as to print a dot of ink on the print medium. Typically the orifices are arranged in one or more linear arrays in a nozzle member. The properly sequenced ejection of ink from each orifice causes characters or other images to be printed upon the paper as the printhead is moved relative to the paper.

In one known design, the ink-jet printhead generally includes ink channels to supply ink from an ink reservoir to each vaporization chamber proximate to an orifice, a metal orifice plate or nozzle member in which the orifices are formed in the required pattern, and a silicon substrate containing a series of thin film resistors, one resistor per vaporization chamber.

To print a single dot of ink, an electrical current from an external power supply is passed through a selected thin film resistor. The resistor is then heated, in turn superheating a thin layer of the adjacent ink within a vaporization chamber, causing explosive vaporization, and consequently, causing a droplet of ink to be ejected through an associated orifice onto the paper.

An exemplary ink-jet cartridge is described in U.S. Pat. No. 4,500,895, entitled "Disposable Inkjet Head," and assigned to present assignee.

Another ink-jet printhead is described in U.S. Pat. No. 4,683,481, entitled "Thermal Ink Jet Common-slotted Ink Feed Printhead," ink is fed from an ink reservoir to the various vaporization chambers through an elongated hole formed in the substrate. The ink then flows to a manifold area, formed in a barrier layer between the substrate and a nozzle member, then into a plurality of ink channels, and finally into the various vaporization chambers. This design is known as a center feed design, whereby ink is fed to the vaporization chambers from a central location and then distributed outwardly into the vaporization chambers.

Commonly assigned U.S. Pat. No. 5,278,584, entitled "Ink Delivery System for an Inkjet Printhead," describes an edge feed printhead design. A barrier layer containing ink channels and vaporization chambers is located between a rectangular substrate and a nozzle member containing an array of orifices. The substrate contains two linear arrays of heater elements, and each orifice in the nozzle member is associated with a vaporization chamber and heater element. The ink channels in the barrier layer have ink entrances generally running along two opposite edges of the substrate so that ink flowing around the edges of the substrate gain access to the ink channels and to the vaporization chambers.

In TIJ pens it is necessary to connect the ink reservoir to the print head. The size of this connection affects the design of the printer that the pens are used in. An ideal reservoir-to-print-head coupler, from a print design point of view, would be no longer than the TIJ head is long, and would be high or tall enough to allow the drive and pinch wheels to get as close to the print head as possible. Any increase in the size of this coupler will compromise the paper handling ability, which may affect the print quality, and increase the size of the printer.

An intended application for this invention is for a spring bag ink-jet pen, although it is not limited to the spring bag pen. In one exemplary spring bag pen design, the pen frame made of a first molded material is lined with a second molded material, such as polyethylene, on the inside to produce a surface suitable for staking the films of the spring bag. The first molded material from which the frame is made could be, for example, an engineering plastic, and provides the necessary structure for the pen which could not be accomplished with the second molded material. This invention relates to the fluid connection of the first and second molded materials in such a way as to provide a space-efficient, leak-resistant connection.

Conventional methods of connecting materials include the use of glue, seals, such as gaskets or 0-rings, or mechanical press fits. In these cases two or more separate parts are fabricated and assembled together to form a single unit. Each part must be designed and sized with respect to its needs in manufacturing, structural integrity, and with the tolerance of the mating part in mind. Such joints as these take up space, and their reliability can be affected by the part tolerances, surface finishes, and the assembly operation.

Commonly assigned U.S. Pat. No. 5,464,578 describes a leak-resistant joint between the first and second molded materials, wherein the second molded material has a shrink rate as the material cools from a molten state, so that the second molded material molded about a standpipe formed of the first molded material will shrink, thereby creating a tight joint between the two molded materials.

SUMMARY OF THE INVENTION

A method of attaching a flexible interconnection circuit assembly to an ink-jet pen cartridge is described. The cartridge includes a frame structure comprising a plastic frame member formed of a first plastic material defining a headland region, the headland region including a cheek area. The method comprises a sequence of the following steps:

forming a layer of a second plastic material which adheres to the plastic frame member and covers the headland region; and heat staking a surface of the interconnection structure to the second plastic material at the cheek area.

The flexible interconnection circuit assembly may include a cover layer which defines the surface of said interconnection circuit. In this case, the second plastic material is heat staked to the cover layer. According to an aspect of the invention, the cover layer comprises a third plastic material, and during the heat staking operation, the second and the third plastic materials are melted at an interface therebetween. Molecules of the second and third plastic materials become mixed together at this interface.

According to another aspect of the invention, the melting temperatures of the second and third plastic materials are well below the melting temperature of the first plastic material. During the heat staking step, the temperatures of the second and third materials are elevated to above their respective melting temperatures at the interface, and the temperature of the first plastic material remains below its melting temperature.

A groove can be formed in the first plastic material at the cheek area, wherein the step of forming the layer of the second plastic material includes filling the groove with the second plastic material to assist in locking the layer in place on the headland region.

The method is applicable to the case in which the interconnection circuit includes a center-fed ink-jet printhead, and also to the case in which the interconnection circuit includes an edge-fed ink-jet printhead.

In accordance with another aspect of the invention, the frame member includes a first side region adjacent and generally transverse to the cheek area, and the method comprises forming a layer of a second plastic material which covers at least a portion of the headland region of the plastic frame member and the first side region of the snout, and a surface of the interconnection structure is heat staked to the plastic material at the cheek areas and at the first side region. This aspect includes heat staking a portion of the surface of the interconnection structure to the layer of the second plastic material at the cheek area, wrapping a portion of the flexible interconnection structure against the side region, and heat staking a portion of the surface of the interconnection structure to the layer of second plastic material at the side region.

In the case in which a second side region is defined adjacent and transverse to the headland region on an opposing side of the snout from the first side region, the step of forming a layer of the second plastic material includes forming a layer of the second plastic material which adheres to the first plastic material and covers the second side region, and the step of heat staking the interconnection circuit includes heat staking the surface of the interconnection circuit to the second side region.

BRIEF DESCRIPTION OF THE DRAWING

These and other features and advantages of the present invention will become more apparent from the following detailed description of an exemplary embodiment thereof, as illustrated in the accompanying drawings, in which:

FIG. 4A is an isometric view of a portion of the snout region of the cartridge of FIG. 1, showing the headland region and the TAB head assembly (THA) suspended above the headland region.

FIG. 11A is an isometric view of the cartridge headland region, with the THA suspended above the headland region illustrating the configuration prior to attachment of the THA. FIG. 11B is a cross-sectional view taken along 11B—11B of FIG. 11A.

FIG. 12 is a partial cross-section of the headland region of FIG. 11A, with the THA suspended above the headland prior to application of heat and pressure to attach the THA.

DETAILED DESCRIPTION OF THE PREFERRED EMBODIMENT

In describing the preferred embodiments, it is to be understood that the drawings referred to herein are simplified in nature for clarity in illustration of the salient aspects of the invention, Thus, for example, only a few of many circuit traces are shown.

Figure 1:
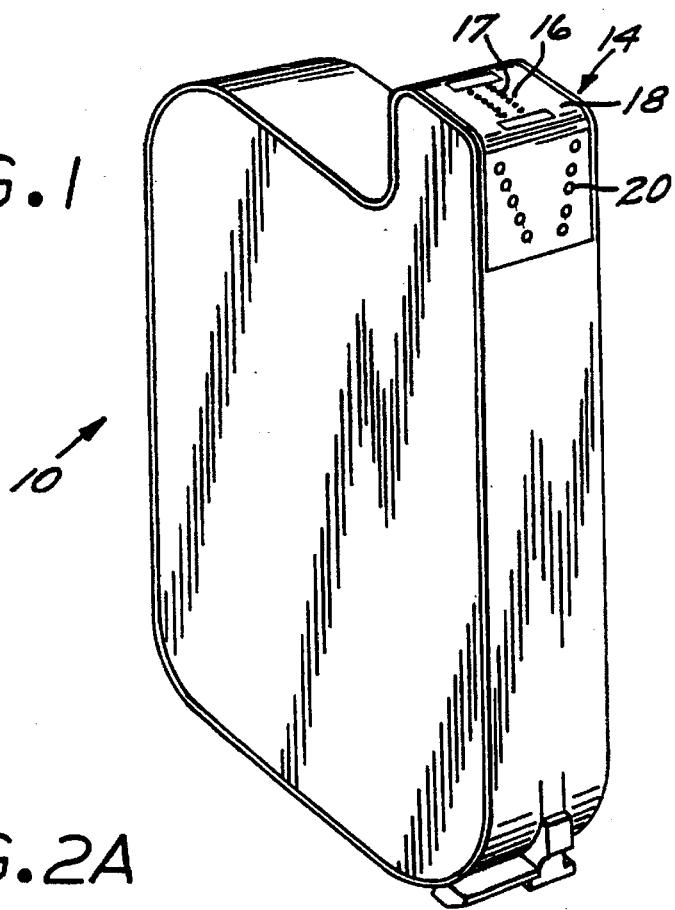
FIG. 1 is an isometric view of an ink-jet cartridge embodying aspects of this invention.

Referring to FIGS. 1–2, reference numeral 10 generally indicates an ink-jet print cartridge including an ink reservoir 12 and a printhead assembly 14. The printhead assembly 14 is typically fabricated using a Tape Automated Bonding (TAB) process, and so may be referred to as a "TAB head assembly" (THA). The THA 14 includes a nozzle member 16 comprising orifices 17 and a flexible polymer tape 18.

Figure 2A:
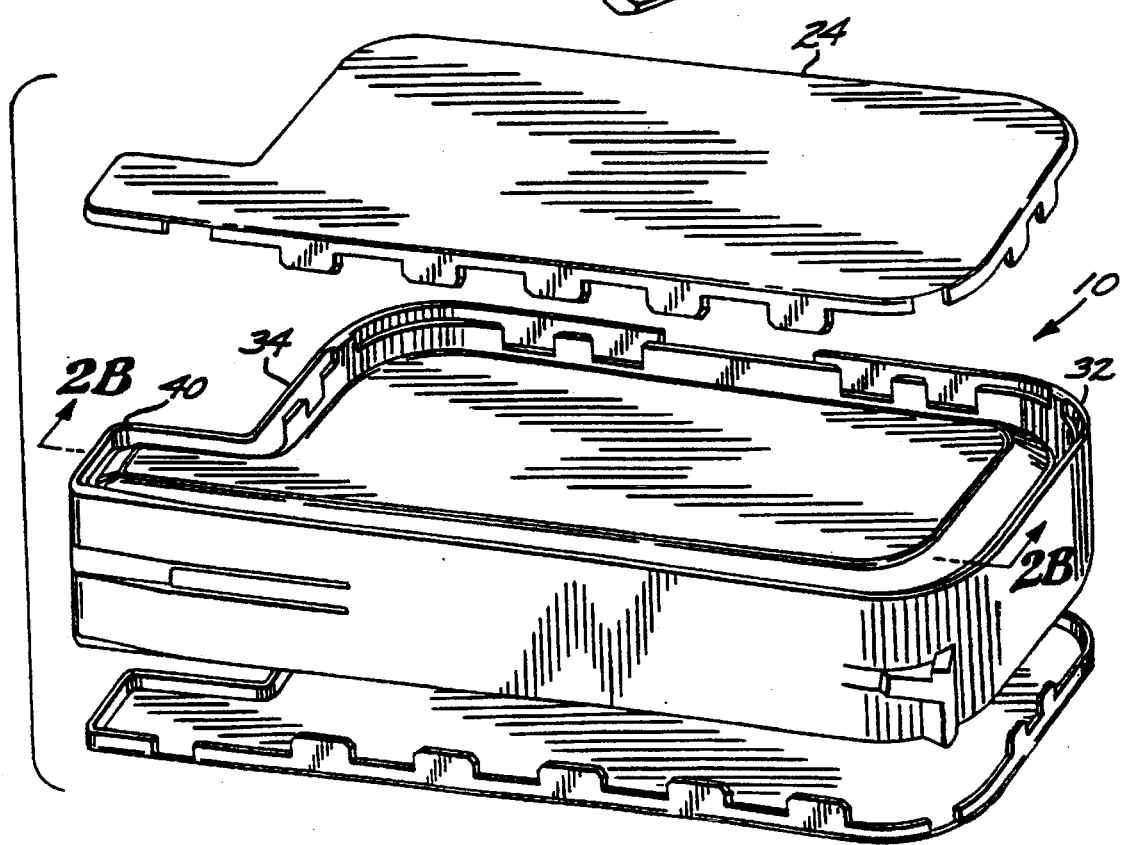
FIG. 2A is an isometric view of the cartridge of FIG. 1 with the side covers removed.

FIG. 2A illustrates the cartridge 10 with a side cover plate 24 removed, illustrating one side of the reservoir 12 and the snout region 40 of the cartridge. The cartridge includes a frame structure 32 fabricated of two chemically dissimilar plastic materials, the first an engineering plastic, e.g., a glass-filled modified polyphenylene oxide (such as the material sold under the trademark "NORYL"), and the and the second an elastomeric polyolefin material. A preferred material for the second plastic material is described in co-pending application Ser. No. 08/058,730, filed May 3, 1993, entitled "Two Material Frame Having Dissimilar Properties for Thermal Ink-Jet Cartridge." The first material is molded to form a rigid outer frame structure 34. This material is preferably of high elastic modulus (typically 200,000 to 800,000 psi or greater) and dimensionally stable to assure good alignment when the print cartridge is installed in the printer. (The datums on the cartridge, which are made of first plastic material, must reference to those of the carriage in the printer.) It tends to have a high melting temperature, allowing various cure pen assembly processes to take place without adversely affecting dimensional accuracy. Otherwise, dimensional shifting during adhesive curing and staking processes could cause the headland to lose its alignment to the datums. Typical materials for first plastic material are polyphenylene oxide with 20 weight percent glass fiber or polysulfone with 20 weight percent carbon fiber.

Figure 2B:
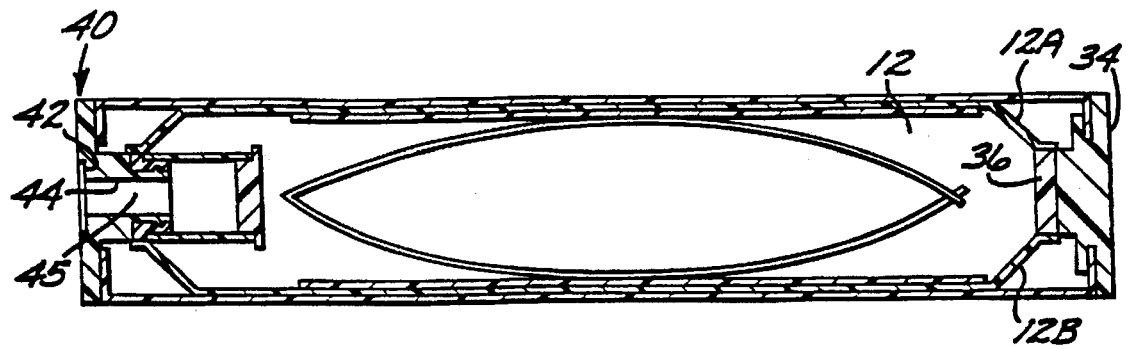
FIG. 2B is a cross-sectional view taken along line 2B—2B of FIG. 2A.

The second material is molded to form an inner structure 36 to which the reservoir membranes 12A and 12B are secured by heat staking (FIG. 2B). This material 36 preferably has a low elastic modulus (typically less than 100,000 psi) and low melting point to facilitate staking processes. In addition this second plastic material is preferably chosen to have a good adhesion with the first plastic material. Dimensional stability that is comparable to the first plastic material is not necessary or possible for the second plastic material. Typical materials suitable for the purpose of the second plastic material include low modulus polyolefins or DuPont Hytrel.

Figure 2C:
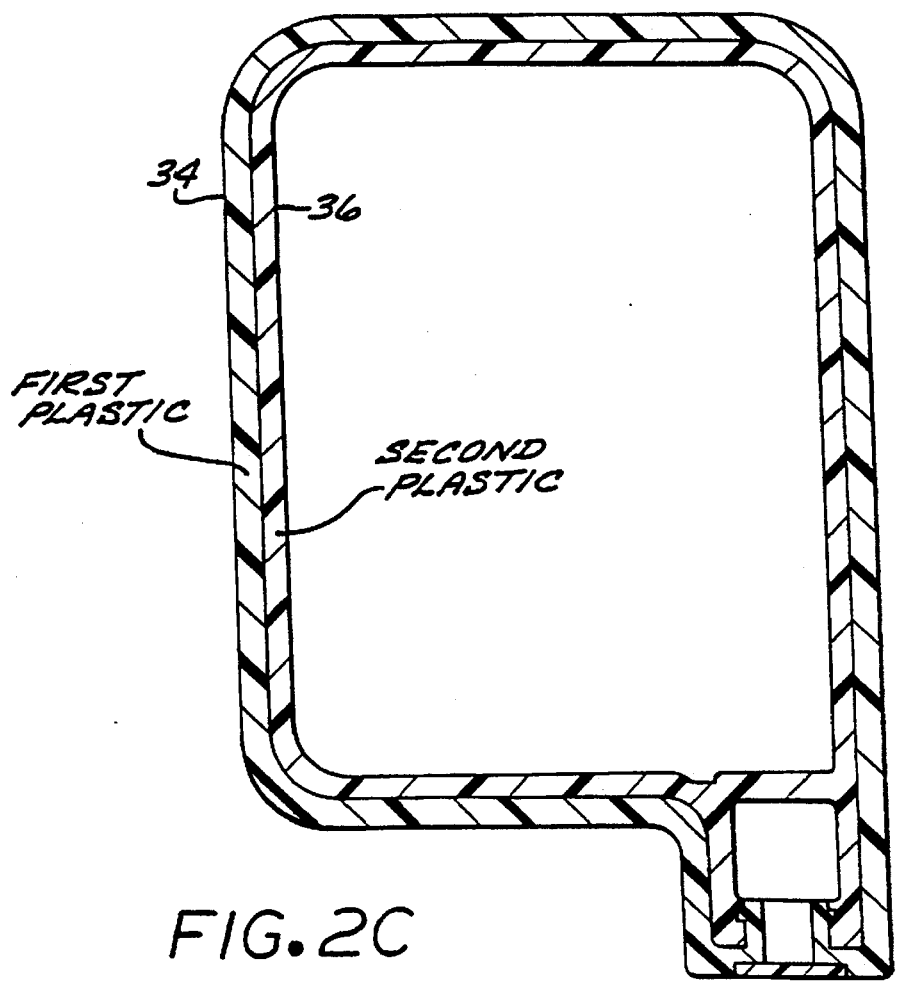
FIG. 2C is a simplified cross-sectional view of the cartridge of FIG. 1, showing the elements of the frame structure.

FIG. 2C is a simplified cross-sectional view illustrating just the rigid plastic frame member 34 and the inner structure member 36. The cartridge 10 includes a snout 40 with a headland region 42 at which the printhead 14 is secured. The engineering plastic material is molded to define a rigid standpipe 44 which defines a standpipe opening 45 forming a part of the ink path from the ink reservoir to the printhead.

Figure 3A:
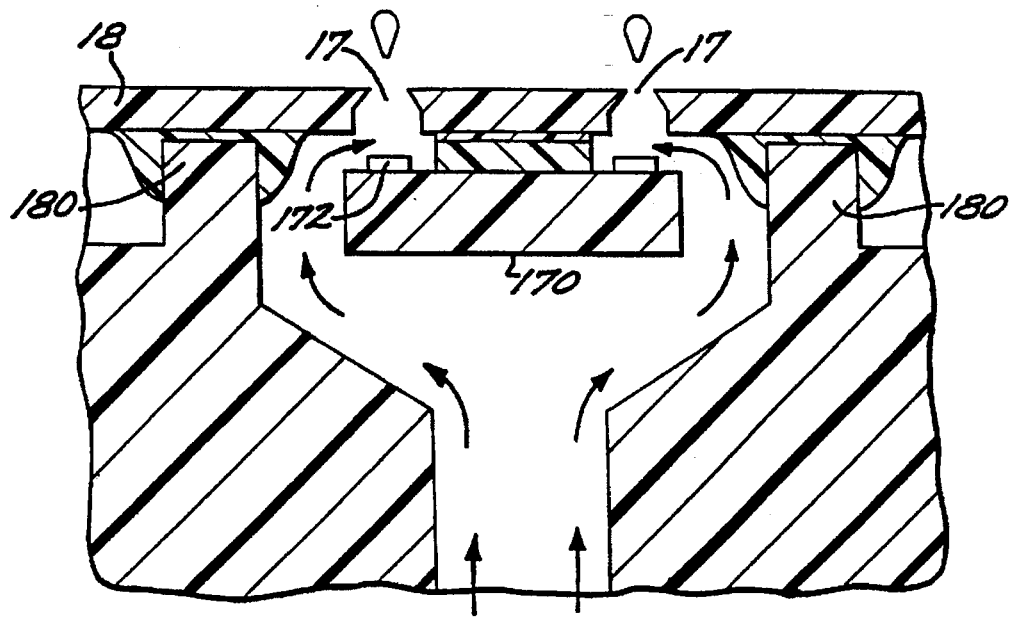
FIG. 3A is a cross-sectional (bottom side) view illustrating a conventional edge-fed printhead configuration.
Figure 3B:
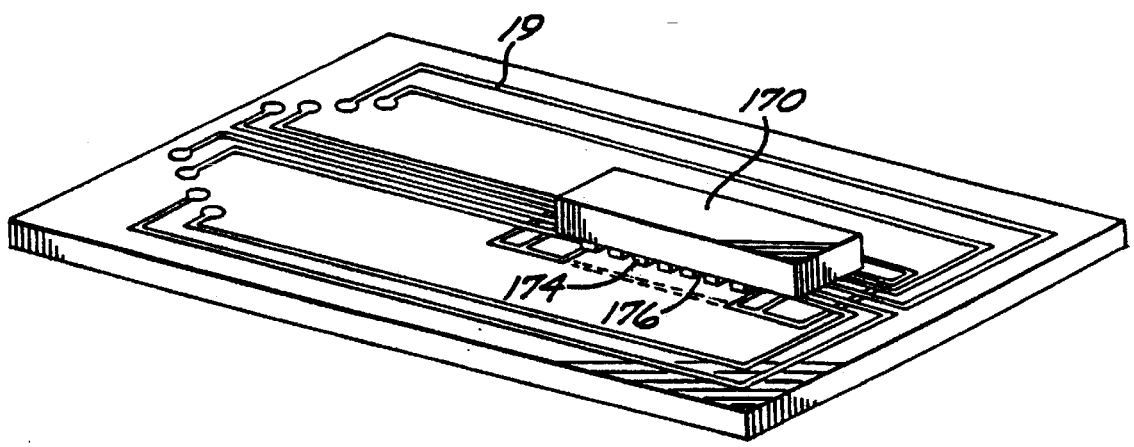
FIG. 3B is an isometric view of this edge-fed printhead configuration.

The invention described herein can be adapted to either center-fed or edge-fed printhead configurations. FIGS. 3A and 3B show an edge-fed printhead configuration as more particularly described in U.S. Pat. No. 5,278,584. The TAB printhead assembly 14 includes a flexible polymer tape 18, e.g., tape commercially available as Kapton TM tape, from 3M Corporation. In this configuration, the nozzles 17 are formed in the tape 18 by, e.g., laser ablation. The back surface of the tape 18 includes the conductive traces 19, which again are terminated in large contact pads 20 exposed on the front surface of the tape. Affixed to the back of the tape 18 is a silicon substrate 170 containing a plurality of individually energizable thin film resistors 172. Each resistor is located generally behind a single orifice 17 and acts as an ohmic heater when selectively energized by one or more pulses applied sequentially or simultaneously to one or more of the pads 20. The traces 19 are routed to the narrow edges of the printhead substrate 170 as shown in FIG. 3B, while the ink is fed to the firing chambers around the long edges of the substrate, as shown in FIG. 3B. A barrier layer 174 is formed between the substrate 170 and the tape 18, and defines ink channels 176 which receive ink from the ink reservoir 12 and direct the ink to the firing chambers. In this edge fed configuration, the tape 18 is secured to rigid beams 180 defined by the engineering plastic material comprising the frame structure 34.

Figure 10:
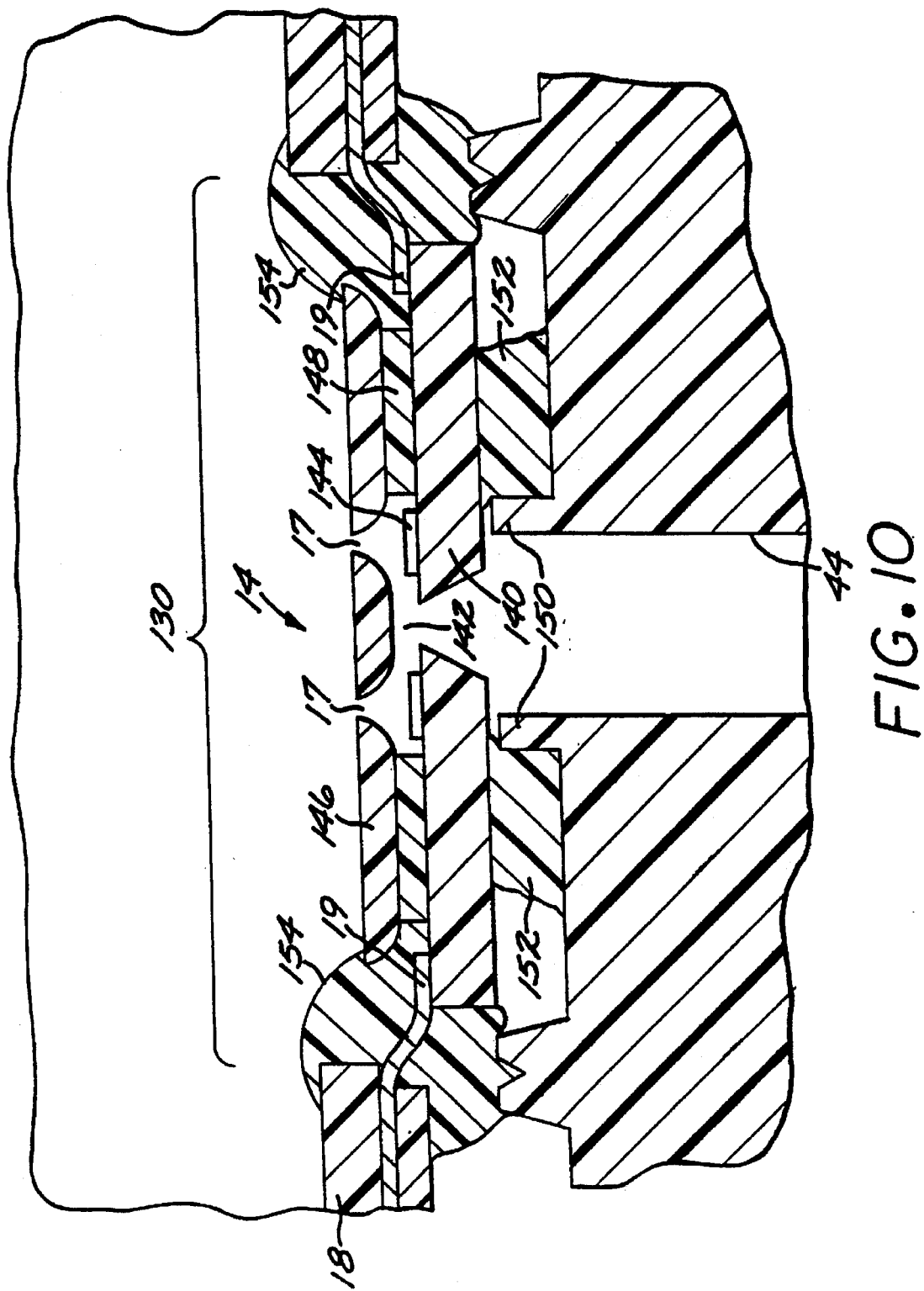
FIG. 10 is a cross-sectional view of a known centerfed ink-jet printhead configuration.

FIG. 10 illustrates in cross-section a known centerfed printhead configuration. In this structure, the TAB printhead assembly 14 includes a flexible Kapton TM polymer tape 18. Conductor traces 19 are formed on a back surface of the tape by conventional photolithographic etching and/or plating processes. These conductive traces are terminated in large contact pads designed to interconnect with a printer, as is the case for the edge-fed configuration of FIGS. 3A–3B. A window 130 is formed in the tape 18; a silicon substrate 140 is secured within the window and the conductive traces 19 are bonded to electrodes on the substrate. The substrate 140 includes a center opening 142 through which the ink flows from the reservoir. Heater resistors 144 are formed on the substrate adjacent corresponding orifices 17 formed in an orifice plate 146 disposed over the substrate and separated from the substrate by a barrier layer 148. In this known arrangement, the substrate 140 is secured against a rigid headland beam 150 defined by the rigid engineering frame material at the output end of the standpipe 44, and held in place by structural epoxy 152. In this known arrangement, to protect the traces, a UV-cured encapsulant material 154 covers the gap between the substrate edges and the window edges formed in the tape.

Jointless Two-material Frame Structure

In accordance with one aspect of the invention, a jointless two-material frame structure is described for an ink-jet pen. In general, the second plastic material coats the inner surface of the standpipe 44 and the headland region 42, to eliminate a joint at which the first and second plastic materials meet in the ink path between the ink reservoir and the printhead. This eliminates a leak risk at such a joint, and the need for chemical compatibility between the first plastic material and the ink.

This aspect of the invention can be applied to both the edge-fed and center-fed printhead configurations. FIGS. 4 and 5 illustrate the edge-fed configuration. FIG. 4A is an isometric view of the snout region 40 of a cartridge of the type shown in FIGS. 1–2, showing headland region 42 and the THA assembly suspended above the headland region prior to attachment thereof. As shown therein, a thin layer of the second plastic material comprising frame structure 36 is brought out to cover the first material rigid frame structure 34 at the headland region, and overlapping onto sides of the snout region.

Figure 4B:
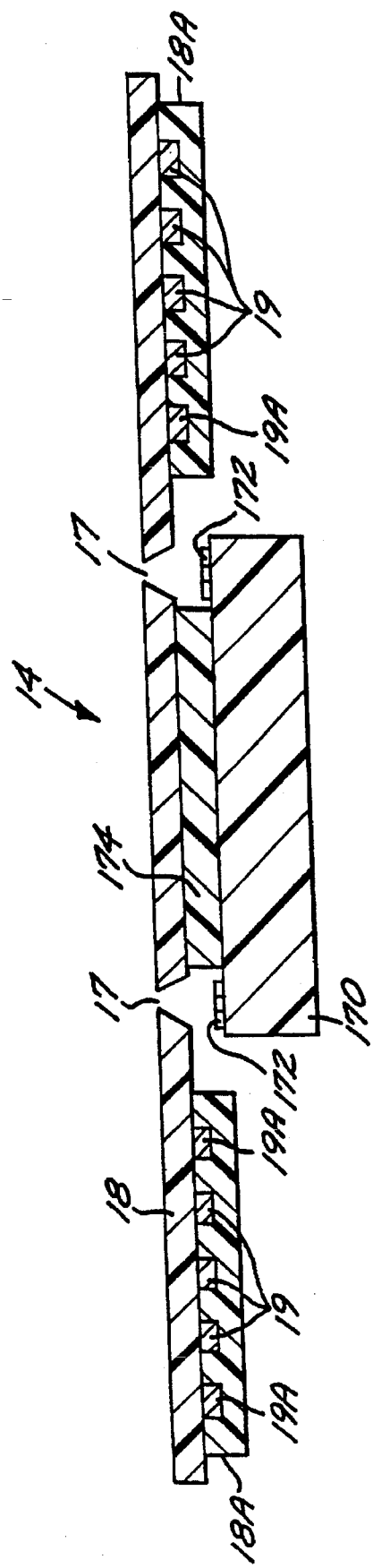
FIG. 4B is a cross-sectional view of the THA, taken along line 4B—4B of FIG. 4A.

FIG. 4B illustrates the THA 14 of the edge-fed configuration of FIG. 4A in cross-section. As shown therein, the silicon substrate or die 170 is secured to a barrier layer 174 on the underside of the Kapton tape 18, with nozzle orifices 17 defined in the tape 18. Thin film resistors 172 are situated on the silicon die 170 beneath respective orifices. Conductive traces 19 are formed on the underside of the tape 18 along the sides of the die; dummy non-current carrying traces are also formed on this side and work with a cover layer 18A to prevent ink shorts by blocking ink flow paths to the conductive traces. The cover layer 18A is attached to the underside of the Kapton tape 18 and under the traces 19 and 19A to further protect the traces. In a preferred embodiment, the cover layer 18A is actually formed of a three-layer laminate, of a 1.5 mil ethyl vinyl acetate (EVA) layer, a 0.5 mil polyethylene terephthalate (PET) layer, and a 1.5 mil ethyl vinyl acetate (EVA) layer. EVA is a thermoplastic material which reflows upon heating, and bonds well to the polyolefin second plastic material. The PET acts as a carrier material that allows punching and handling the film without stretching. In some applications, a single layer cover may be appropriate, e.g., a single layer of EVA, polyolefin, ethyl acrylic acid (EAA) or some other material. Corona discharge treatment is frequently a good means of enhancing adhesion between polymer films that would otherwise exhibit marginal adhesion; plasma etching can also be used to improve adhesion.

Figure 5A:
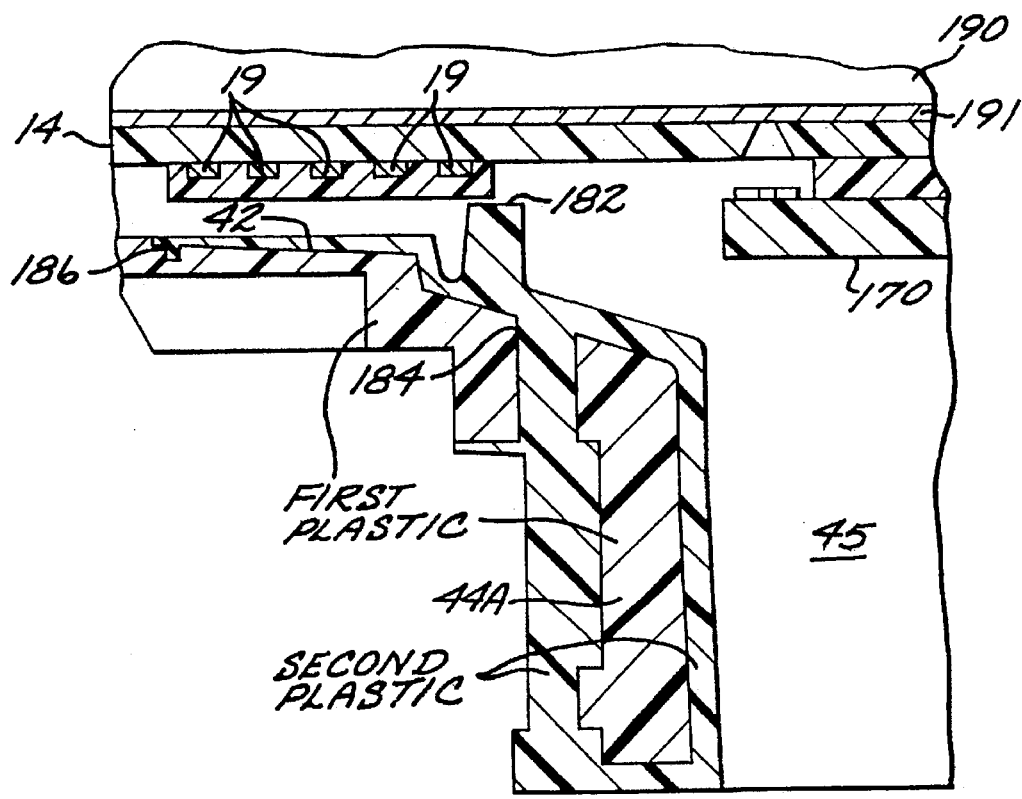
FIG. 5A is a partial cross-sectional view of an edge-fed ink-jet printhead configuration embodying the invention, showing the THA suspended above the headland region prior to attachment of the THA to the headland region.
Figure 5B:
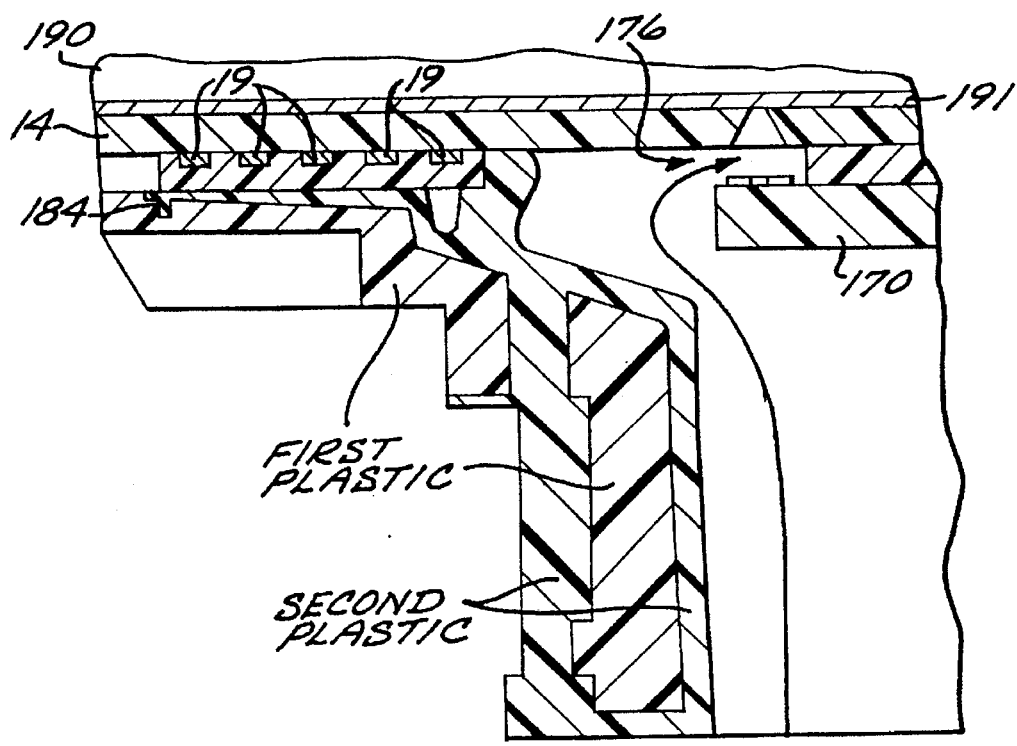
FIG. 5B is similar to FIG. 5A but taken after attachment of the THA to the headland region.

FIG. 5A shows the edge-fed THA 14 suspended just above the headland region 42, prior to attachment of the THA. FIG. 5B shows the cartridge and THA after THA has been attached to the headland region. Only a portion of one side of the pen structure is shown in FIG. 5A; the other side of the pen structure opposite the standpipe opening 45 is the mirror image of the illustrated portion. The standpipe 44 is defined by the rigid first plastic material shown in cross-section as element 44A. The elastomeric second plastic material forms a coating over the inner surface of the standpipe opening 45 and continues to cover the headland region 42 and a complaint beam 182. The undersurface of the Kapton tape 18 is bonded to the headland region 42 at the compliant beam, forming a joint between the second plastic material and the inner surface of the tape 18 which is ink-leak proof. The ink flows from the ink reservoir 12 into the standpipe opening 45 and to the long edges of the silicon substrate 170. The ink enters the side ink channels 176 and proceeds to the firing chambers. As a result, the ink does not come into contact with the first plastic material nor any joint between the first and second plastic materials, and thereby eliminates an ink leak risk.

Figure 11A:
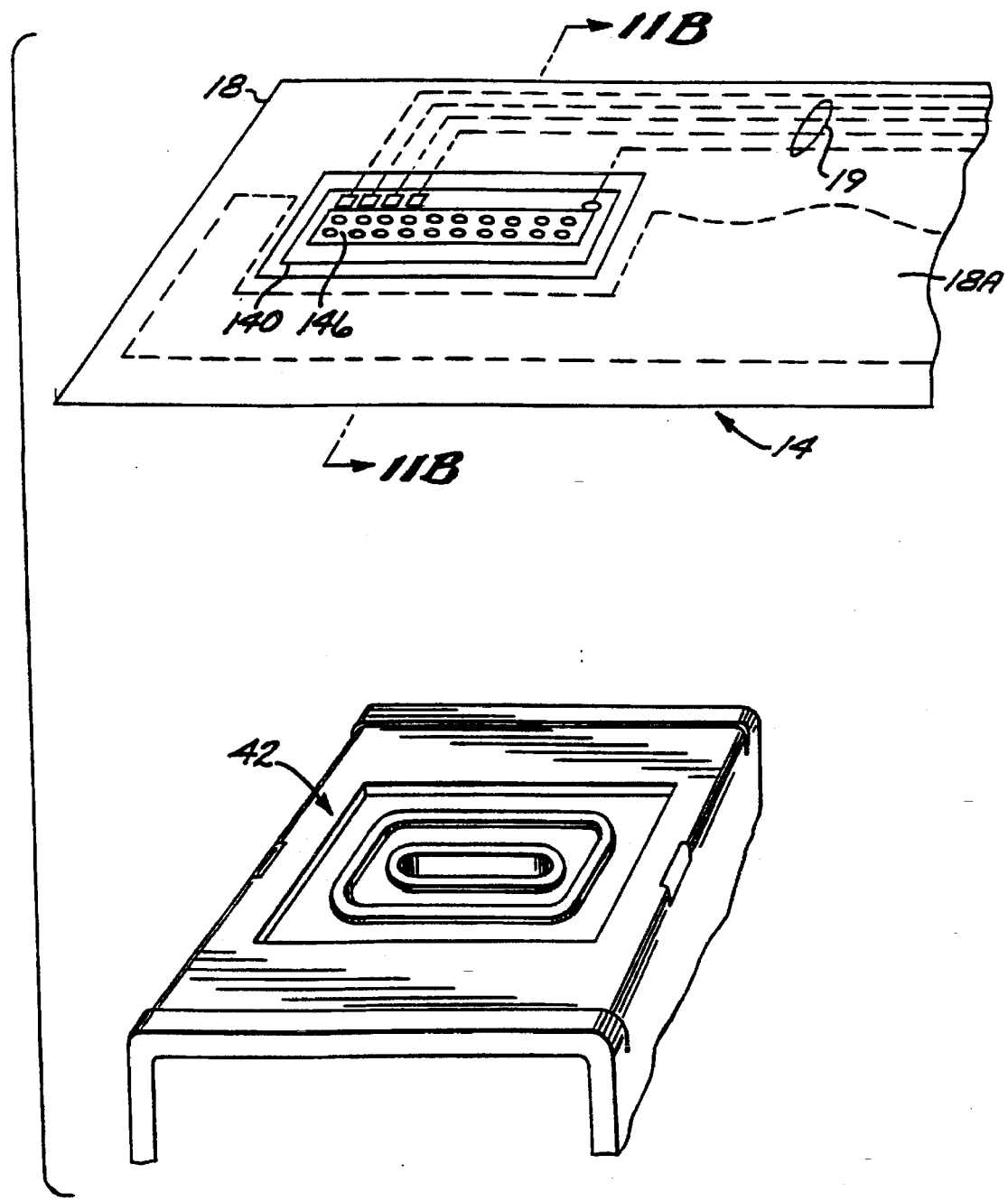
FIGS. 11A–11B illustrate a center-fed printhead configuration.
Figure 11B:
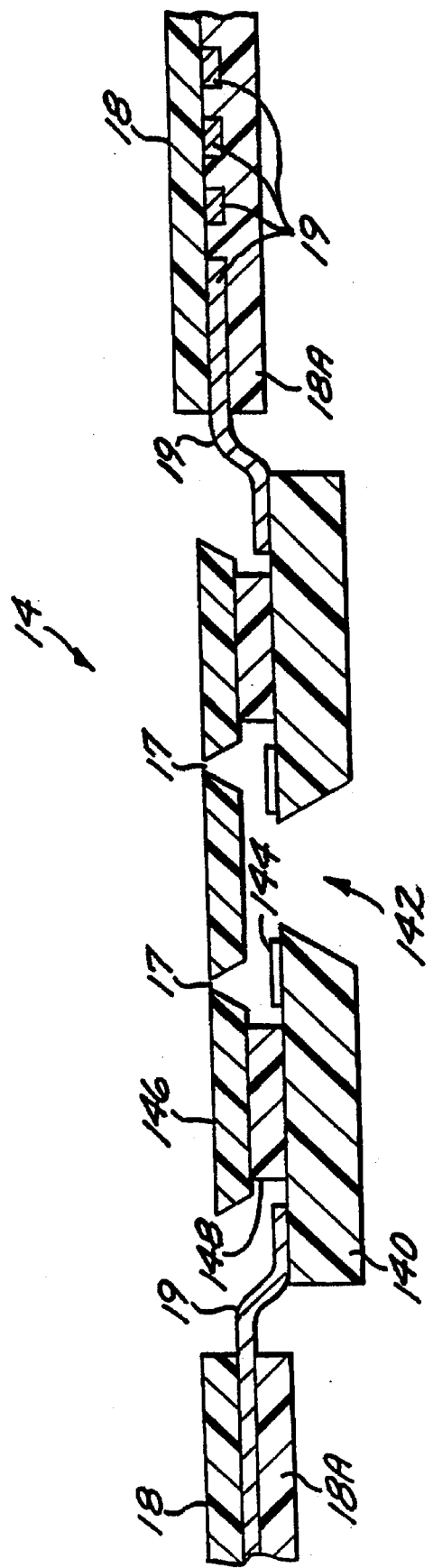

FIGS. 11A–11B illustrate a center-fed printhead configuration. FIG. 11A is an isometric view of the headland region 42 of the cartridge, with the THA 14 suspended above the headland region illustrating the configuration prior to attachment of the THA to the headland region. FIG. 11B is a cross-sectional view taken along line 11B—11B of FIG. 11A, illustrating the THA 14. As shown in FIG. 11B, the center-fed configuration includes the silicon substrate 140 in which the center opening 142 is formed to deliver ink to the firing chambers above the thermal ink-jet resistors 144 formed on the substrate surface. A barrier layer 148 separates the substrate 140 and the orifice plate 146. The traces 19 provide a means of energizing the resistors. Dummy traces are also provided, in order to provide ink short protection. A cover layer 18A disposed on the underside of the Kapton tape 18 covers the traces 19.

Figure 13:
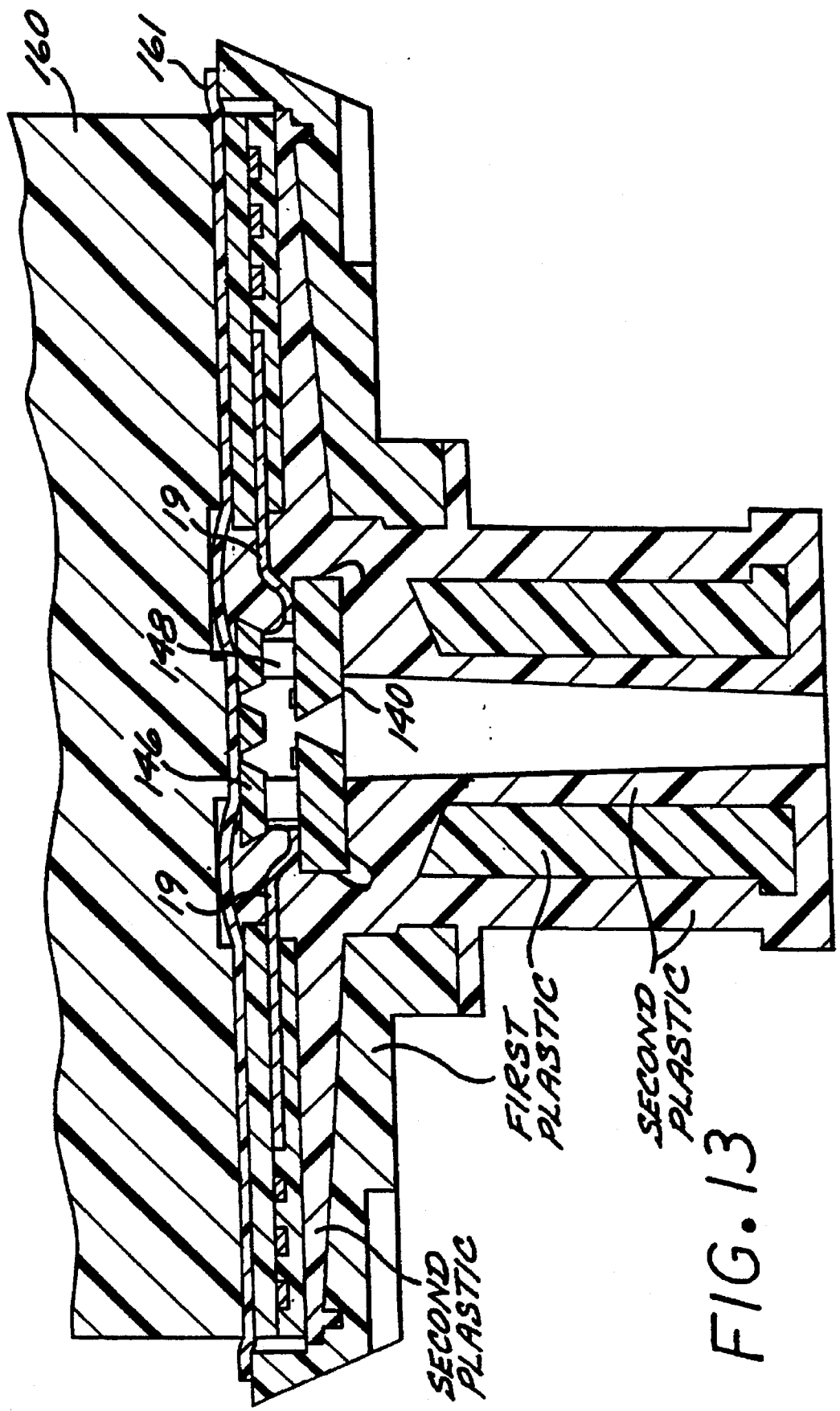
FIG. 13 is a view similar to FIG. 12, but taken after application of heat and pressure to the THA by the staker horn.

FIG. 12 is a cross-sectional view taken through a snout region of a pen employing a center-fed print head configuration. This view is taken through the standpipe 44 and transverse to the longer edges of the printhead 14. Here it will be seen that the standpipe 44 is defined by rigid plastic material 44A which also defines the rigid outer frame structure 34. In accordance with the invention, the elastomeric second plastic material of the interior frame member is molded to cover the interior of the standpipe opening 45, and in a continuous layer to cover a recessed area 42A at the exterior surface of the headland region 42. In FIG. 12, the THA 14 is shown suspended above the recessed area 42A, just prior to application of heat and pressure to attach the THA. FIG. 13 is a view similar to FIG. 12, but showing the arrangement with a heat staker horn 160 applying heat and force against a scrim sheet 161 separating the THA from the staker horn. The silicon substrate 140 comprising the printhead is mounted in the recessed area 42A of the headland region 42 and secured to the layer of second plastic material to form a seal around the periphery of the center substrate opening 142. As will be described in further detail below, FIGS. 12 and 13 further illustrates a method for bonding the flexible interconnection circuit 18 in place.

Still referring to FIG. 13, ink flows from the reservoir 12 into the standpipe 44 through the ink path and then through the standpipe opening 45 to the center opening 142 of the silicon substrate, all without coming into contact with the first plastic material defining the rigid outer frame structure 34, or into contact with a joint between the first plastic material and the second plastic material.

There are several advantages flowing from this aspect of the invention. One is the elimination of a leak risk due to ink leaking through a joint between the first and second plastic materials. A second advantage is the elimination of the issue of compatibility of the first plastic material with the ink, since the ink does not come into contact with the ink. A third advantage is the elimination of potential contamination of the ink by particulates originating from filler material in the first plastic material. Such filler materials may include, for example, glass and carbon fibers used to enhance the properties of the first plastic materials. Particles of the filler materials could contaminate the ink if the ink came into contact with the first plastic material, leading to blockage of the printhead nozzles. A fourth advantage is that the second plastic material can present a smoother surface along the ink path than that presented by the second plastic material, particularly if fillers are used in the first plastic material. Air bubbles tend to collect on the inside of the pen cartridge during the initial fill and prime process, leading to reliability problems; bubbles tend to collect more readily on rough surfaces than on smooth surfaces.

Similar Material Thermal TAB Attachment

In accordance with another aspect of the invention, the second frame material is brought to the surface of the two material frame structure for use in bonding to the surface of the TAB circuit. In many applications, a polymer coating such as the cover layer 18A is applied to the undersurface of the Kapton tape 18 for ink-shorts protection. In other applications, the polymer coating is not applied to the tape 18. Typically the polymer coating on the TAB circuit has a melting point that is similar to that of the second plastic material. Because the polymer coating on the TAB circuit can be engineered to be chemically similar to the polyolefin second plastic material, it is possible to obtain a chemical bond at the joint between these materials which is superior to a bond between the contacting surface of the TAB circuit and the first plastic material. In particular, it is desirous that the first plastic material, the second plastic material and the cover material 18A or the Kapton tape 18 be designed as a system to obtain good adhesion at the joints between the materials. Materials other than those heretofore described for the first and second plastics and the cover layer 18A and tape 18 could be used. Other possible materials for the second plastic material include EVA and polymers having chlorine or fluorine attached thereto. In general, thermoplastic polymers are preferred materials. These include the polyolefin and EVA materials. A particularly useful property is that the second plastic material and the cover layer 18A be miscible at the heat stake interface, so that molecules of the two materials mix at the interface. Having the melting points of the two materials comparable will greatly enhance such mixing at the interface.

The edge-fed printhead structure of FIGS. 4–6 illustrates this aspect of the invention. FIG. 5 shows the second frame material covering the headland region 42 and extending underneath the edges of the THA 14. The second plastic material fills a hole in the first plastic material at 184, thus locking together the layer of the second plastic material covering the headland and the portion of the second plastic material internal to the frame structure. Further, a groove 186 is defined in the first plastic material at the edge of the headland region along each long side of the headland region. A groove is used here as a locking element since there is no second plastic material to lock to beneath the headland at this point, and because in this embodiment, this area is past the major shut-off between the molding of the two frame structures. During the molding of the second frame structure, the second plastic material can be gated to the headland region from inside the frame either through holes in the first plastic member or from down the inside surface of the standpipe.

FIGS. 5A and 5B show THA 14 placed over a section of the headland with a representative heat staker horn 190. The horn may include a thermal heating element or an ultrasonic heating element. The horn 190 typically will have a flexible scrim sheet layer 191 covering the THA so that the second plastic material melt does not stick to the horn. A typical material for the scrim sheet is TEFLON (TM) available from DuPont; a layer thickness of 2 mils has been found to function well. As the pressure and temperature is applied (FIG. 5B), the second plastic material which has been molded over the headland region 42 adheres to the cover layer 18A. In the case of pens that do not need a cover layer over the TAB traces, the second material will act to bond directly to the Kapton and copper trace material in a manner similar to the manner in which a hot melt material would bond to the Kapton and copper. As heat energy is applied, the viscosity of the second plastic material lowers with the result that the material flows and wets to fill the window in the TAB circuit and space above the traces.

Figure 7:
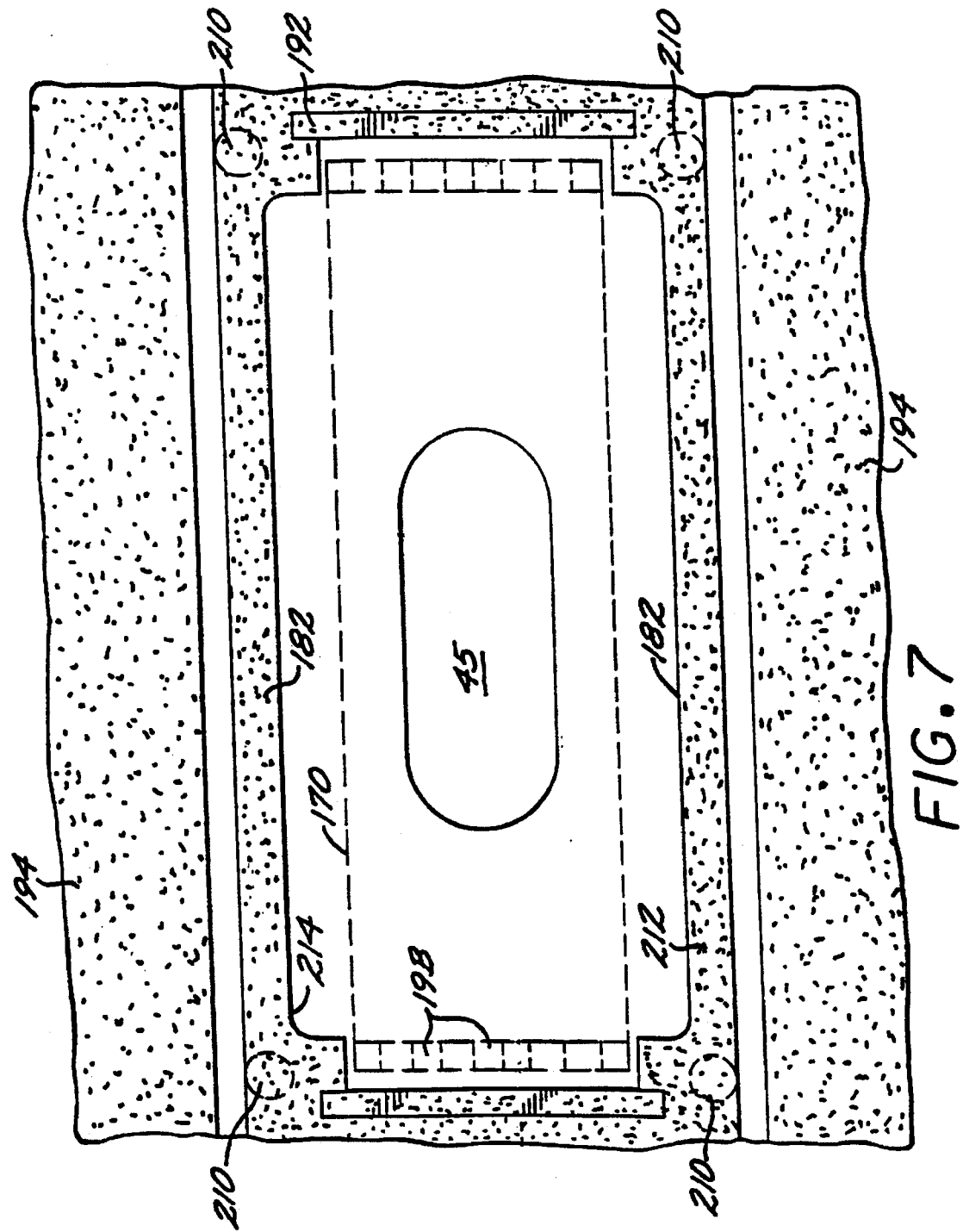
FIG. 7 is a simplified top view of the edge-fed printhead configuration.

FIG. 7 is a simplified top view of a portion of the snout region with the THA 14 attached to the headland region 42 in the manner just described regarding FIGS. 5A and 5B. Here, the primary printhead-to-headland ink seal areas are above the compliant beams 182 and ridges 192, as indicated by the stipled areas 212 (FIG. 7). The cover layer 18A partially overlaps the compliant beam 182. Therefor, the beam partially bonds to the cover layer and partially to the Kapton tape along the long axis of the substrate. Along the short axis of the substrate, the overlap may not be possible, depending on the positional tolerance of the cover layer. If this overlap is not possible, then the second plastic material is optimized for maximum adhesion to Kapton, and treatment such as corona discharge used to maximize adhesion.

The stipled areas 194 running along the long edges of the printhead outside the compliant beams 182 are the "cheek" areas of the headland region 42, at which the undersurface of the THA 14 is heat staked to the second plastic material which covers the headland region. As indicated in FIGS. 5A and 5B, the cover layer 18A overlays the second plastic material in the cheek areas, and so there is a chemical bond between the cover layer and the second plastic material, thereby improving the adhesion in these areas.

FIG. 7 shows pillars 210 at the respective four corners of the headland region. These pillars are fabricated of the rigid plastic material, and their height is selected so that the top surface of the pillars provide registration surfaces against which the THA layer will come to rest upon application of heat and pressure during the heat staking operations used to attach the THA to the headland. Thus, the pillars 210 precisely register the Z position of the THA.

FIGS. 12 and 13 illustrate application of this aspect of the invention to center-fed printhead configurations. As shown therein the second plastic material lines the headland region 42 out to the area subtended by the THA 14, and during the heat staking operation as shown in FIG. 13, the cover layer 18A underlaying the Kapton tape 18 becomes chemically bonded to the second plastic material.

Figures 6A, 6B:
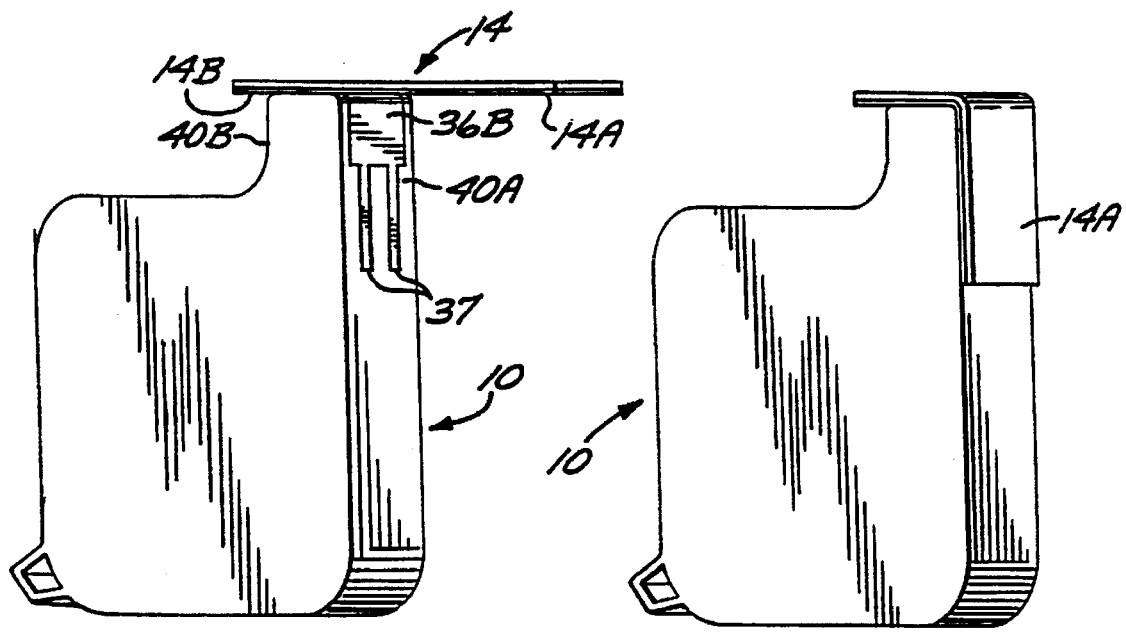
FIGS. 6A and 6B are isometric views illustrating the attachment of the tab side of the THA to the cartridge.
Figures 6C, 6D:
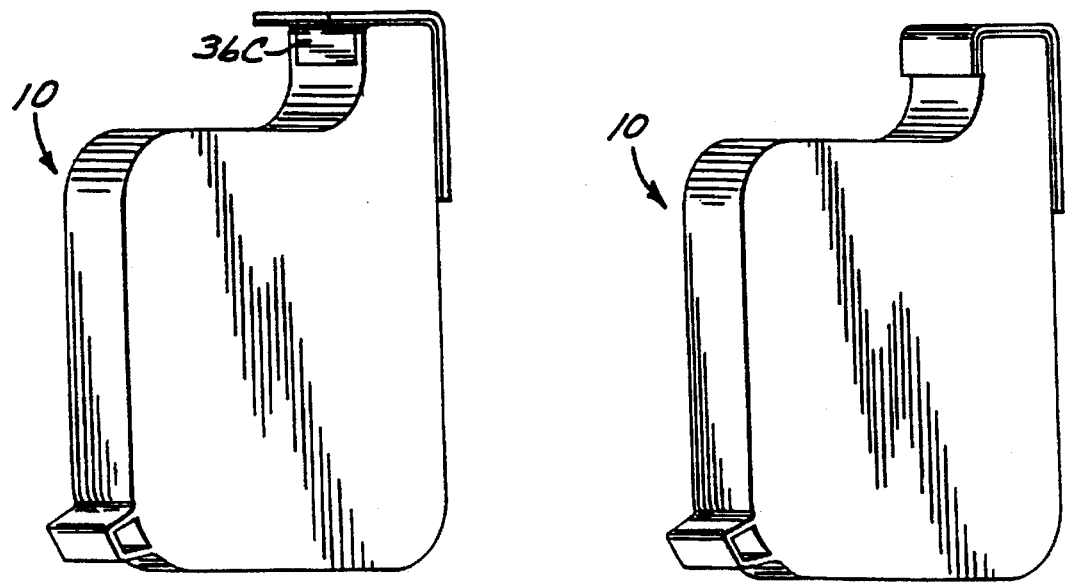
FIGS. 6C and 6D are isometric views illustrating the attachment of the flap side of the THA to the cartridge.

This aspect of the invention makes possible improved adhesion of the TAB circuit to the flap and wrap sides 40A and 40B of the snout region 40. During the THA attachment process, flap and wrap portions of the flexible THA 14 are wrapped around the top corners of the snout and downwardly, against the respective flap and wrap sides of the snout region, and are adhered to these sides. In the past, the attachment was directly between the Kapton tape 18 and the rigid first plastic material. To provide improved adhesion between the TAB circuit and the sides of the snout region, the second plastic material is molded over the first plastic material to provide areas to which the tape 18 or cover layer 18A formed thereon can be heat staked. On the wrap side 40A, the second plastic material forms a layer 36B and elongated areas 37 (FIG. 6A), formed in recesses in turn formed in the first plastic material. On the flap side 40B, the second plastic material forms a layer 36C (FIG. 6C). During the fabrication, after the THA has been heat staked to the headland region 42 of the snout 40, the region 14A of the THA 14 is wrapped against the side 40A, and heat and pressure applied by a staker horn (not shown) to heat stake the THA region 14A to the snout wrap side 40A (FIG. 6B). Similarly, the region 14B of the THA 14 is pressed against the side 40B, and heat and pressure applied by a staker horn to heat stake the THA region 14B to the snout flap side 40B (FIG. 6D). This technique for attaching the flap and wrap sides to the THA can be employed for either the edge-fed or center-fed printhead configuration.

There are a number of advantages to this attachment technique. For example, the heat staking resulting in melting and some flowing of the second plastic material can be used in the heat stake region to flatten out sink due to molding in the first plastic material and to fill in coring grooves in the first plastic material. With this attachment technique, the headland area of the TAB circuit is attached to the pen body with a single heat staking operation. This in turn eliminates the stress induced on the TAB circuit by multiple heat stake cycles, and the potential that the ink short coating on the TAB circuit surface may come loose from the TAB circuit. Another advantage of bonding the THA to the second plastic material is the ability of the second plastic material to reflow with temperatures and pressures low enough to not compromise the dimensional stability of the first plastic material and to not damage the THA. A melting point of 170–350 degrees Fahrenheit is typical for the second plastic material. An exemplary heat stake temperature range for the heat staker is 350–450 degrees Fahrenheit; an exemplary force applied to the staker during the heat stake process is about one to five pounds. If the second plastic material and the THA cover layer 18A have similar melting points and are miscible, then mixing will occur at the interface. In addition, the melting of the two materials and reflowing of the materials will resolve lack of planarity of the surfaces being bonded together. Further, this TAB circuit attachment technique, as applied to edge-fed printheads, eliminates the need for a separate end tacking procedure, wherein the TAB circuit is tacked down on each end thereof to eliminate a TAB lifting problem. With this invention, since the second plastic material makes a chemical bond with the ink-shorts coating on the TAB circuit, the joint is extremely strong, no separate end tacking procedure is required. Also, on center-fed printheads, the invention eliminates the need for beads of encapsulant material to be applied down the edges of the TAB circuit to hold it down.

It is noted that a polymer such as a polyolefin material used in an exemplary embodiment may require treatment by a corona discharge tool, plasma etching (oxygen ashing) or the addition of an adhesion promoter. Such treatment is recommended in the event the TAB circuit does not employ an ink shorts coating such as EVA. The polyolefin second plastic material will readily heat stake to an EVA layer without any treatment. In the absence of the EVA coating layer, the corona discharge tool treatment prior to heat staking facilitates the bond between the polyolefin and the Kapton and copper trace surface of the TAB circuit. The corona treatment creates free radicals on the surface of the polymer; the free radicals are sites where chemical bonding can take place.

Adhesiveless Ink-Jet Pen Design

In types of ink-jet cartridges developed by Hewlett-Packard Company, the assignee of this invention, the cartridge includes a thermal ink-jet head assembly, i.e., the THA, including a flexible tab circuit on which is mounted a printhead die, to which is in turn mounted an orifice plate. A cover layer underlies the flexible circuit. The THA is attached to the pen body at a location so as to channel ink from an ink reservoir to the firing chambers of the printhead orifice plate. The cartridge may include, as previously described, a snout region defining at a tip thereof a headland region surrounding an outlet port of a standpipe leading to the ink reservoir. Heretofore, the THA has been conventionally attached to the headland region by a thermal set epoxy adhesive material, which must be precisely dispensed through a dispenser needle to avoid excess adhesive from sealing orifice nozzles, while at the same time providing sufficient adhesive to avoid leaks. The adhesive requires a cure time of two minutes or so. During this time, the THA must remain precisely aligned with and parallel to the headland. This requires a process upstream of the adhesive cure at which time the THA is aligned and reliably tacked in position to maintain in-plane alignment. Additional fixturing may also be required to maintain the precise parallelism.

It would therefore be an advantage to provide an improved method of attaching the THA to the headland region which did not require a step of dispensing an adhesive and a long cure period. This aspect of the invention provides such an improved method.

FIGS. 5A and 5B illustrate the application of this aspect of the invention to an edge-fed printhead configuration. In this embodiment, the THA 14 includes a cover layer 18A adhered to the bottom surface of the Kapton tape 18 to provide protection against ink shorts, by preventing ink flow to the traces 19.

In accordance with this aspect of the invention, the THA is attached to the headland region 42 by a heat stake operation. The compliant beams 182 formed of the second plastic material extend upwardly from the headland region of the frame structure to the coating 18A and the Kapton layer of the TAB circuit 18. The beams 182 connect with transverse ridges 192 which extend upwardly along the short sides of the printhead substrate 170. The ridges 192 extend higher than the beams 182, as shown in FIG. 4A, to provide melt material for trace encapsulation, as discussed more fully below. Thus, the beams 182 and ridges 192 define an enclosed race track 214 extending completely around, and spaced from, the standpipe opening 45. The race track 214 therefore substantially circumscribes the standpipe opening 45. The beams 182 and ridges 192 are formed of the second plastic material, i.e., in this embodiment a polyolefin material. During the heat stake operation the THA 14 is bonded to the racetrack. In general the process is optimized to bond the racetrack to the Kapton layer 18 of the THA 14.

FIG. 5A shows the staker horn 190 disposed above the THA 18, prior to application of heat and pressure, i.e., prior to the bonding of the THA 14 to the headland. In FIG. 5B, the THA 18 is shown in the bonded state, i.e., after application of heat and pressure by the staker horn 190, resulting in reflowing of the polyolefin material forming the ridges 192 and the beams 182. The polyolefin material bonds chemically to the EVA layer comprising the ink-shorts protection coating on the underside of the Kapton layer 18. Upon removal of the heat and pressure applied by the horn, the polyolefin material solidifies, resulting in a very strong bond between the headland region of the pen and the THA 14. This attachment technique results in a seal between the race track and the THA which is highly resistent to ink leaks from ink flowing from the ink channel to the printhead.

An adhesion promoter may be applied to the polyolefin, e.g., as a coating on the second plastic material or as a constituent of the polyolefin, to promote adhesion between the polyolefin and the EVA layer and/or the Kapton. The adhesion promoter can, for example, be sprayed on the headland region in a thin layer preferably less than one millimeter in thickness, without the need for precise application measures. Such adhesion promoters are well known in the art. Other techniques for enhancing adhesion between two polymers include treatment by a corona discharge tool or plasma etching, as described above.

FIGS. 12 and 13 illustrate application of this aspect of the invention to a center-fed printhead configuration. FIG. 12 shows the staker horn 160 poised at the headland region, with the substrate 140 comprising the THA resting on the pedestal 158 formed of the second plastic material. Cavities 162 are formed in the staker horn above the segments of the window 130 formed in the Kapton tape layer 18 adjacent the substrate 140 and orifice plate 146. The cavities permit the flow of the second plastic material in melted form from the beams 156 to flow up and fill the windows 130 and encapsulate the traces 19 connected to the printhead, as described in more detail below.

The substrate 140 is received on a pedestal 158 formed of second plastic material surrounding the standpipe opening 45. As heat and pressure are applied on the THA by the staker horn, the second plastic material forming the beams 156 and the pedestal 158 melts and reforms around the edges of the substrate 140 and over the top edges to the edges of the orifice plate 146, thereby encapsulating the substrate 140 to form a three dimensional seal. FIG. 13 is similar to FIG. 12, but shows the configuration after the second plastic material has reflowed and bonded to the substrate 140. By use of an adhesion promoter, a chemical bond can be formed between the polyolefin and the silicon substrate. This embodiment allows for a mechanical lock as well, in that the second plastic material reflows around edges of the silicon substrate 140.

The second plastic material is molded as part of the process to mold the frame 32. Because molded features can be located and sized much more accurately than dispensed adhesive, the variability of the displaced second material is much lower than it would be for dispensed adhesive. This results in a much improved process yield.

Adhesiveless Encapsulation for Ink-jet Cartridge

In many thermal ink-jet devices, a die is connected electrically to a control device so that energization signals may be provided to stimulate the printhead to eject the ink droplets. Typically, a TAB flexible interconnection circuit is used for this connection purpose. The die is mounted to a surface of the circuit, and the conductive traces on the interconnection circuit are connected to die control pads by overhanging conductive leads. Without any protection, these leads are exposed and susceptible to electrical shorting as well as chemical and mechanical damage.

A conventional technique for protecting the die traces is to dispense a liquid encapsulation material through a needle dispenser so that the exposed traces are encapsulated by the dispensed material. This material typically is either a thermally cured or an ultraviolet light (UV) cured material. The process to apply the material is typically rather involved, and includes the typical steps of preheating the area to be encapsulated, applying the encapsulation material through a dispenser, inspecting the applied material, and curing the applied material by heat or in a UV oven. Such encapsulation steps add time and cost to the process of fabricating the ink-jet pen devices.

Another drawback of the conventional encapsulation process is that the encapsulation when cured generally has some height above the TAB circuit. This distance above the TAB circuit must be accounted for in the spacing of the ink-jet pen above the print medium. As this spacing increases, the locational error induced by misdirected drops also increases, reducing print quality. Also, the spacing distance makes capping and wiping the orifice plate surface more difficult. To keep the nozzles from drying out when the printhead is not in use, typically a rubber cap is sealed over the nozzles. Tall encapsulation beads interfere with the cap's seal to the pen. As a pen is exercised, nozzle spray (ink) builds up around the nozzles, eventually blocking and/or misdirecting the nozzles. A rubber wiper is typically used to remove this buildup. A tall adhesive bead will tend to impede the ability of the wiper to service the end nozzles that are adjacent to the bead. Moreover, the encapsulation material can leach out during the processing and can flow to and affect nearby nozzles on the ink-jet head.

In accordance with another aspect of the invention, the traces are adhesivelessly encapsulated, thereby avoiding the problems of the conventional encapsulation techniques.

Figure 8:
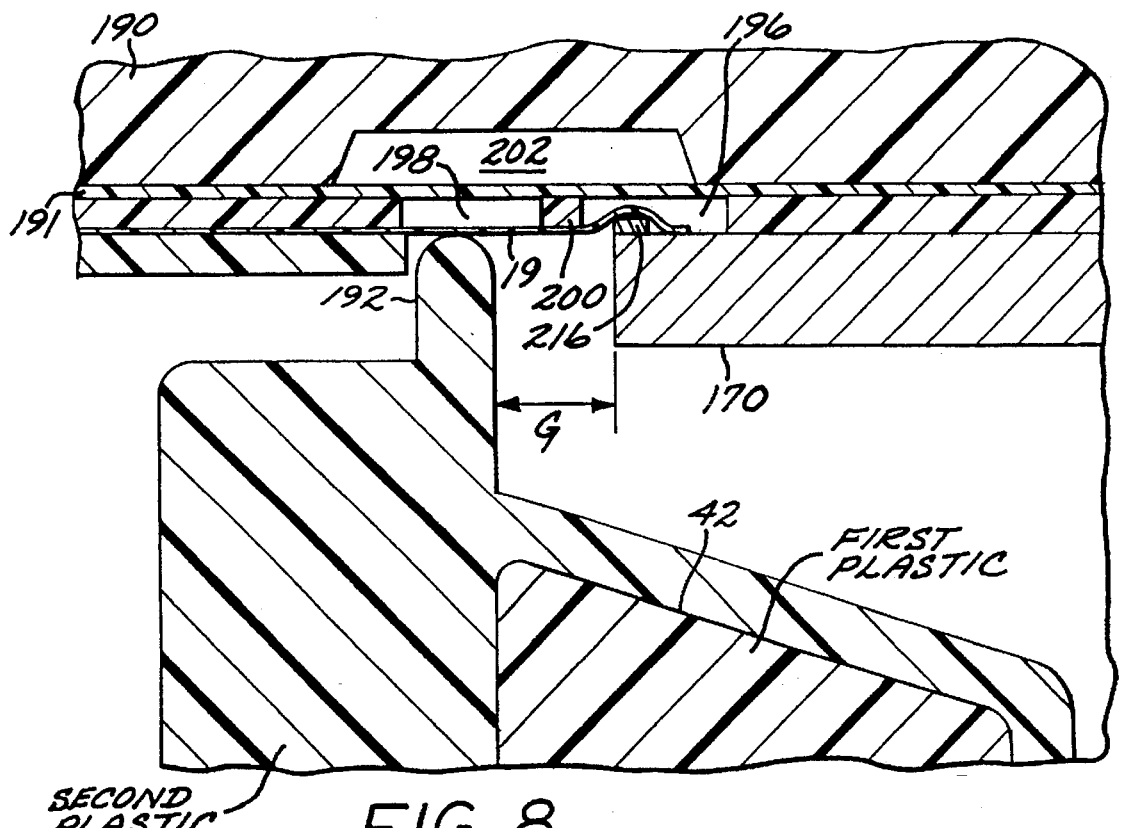
FIG. 8 is a partial cross-sectional view illustrating an encapsulation aspect of the invention on an edge-fed printhead configuration, taken prior to application of heat and pressure.
Figure 9:
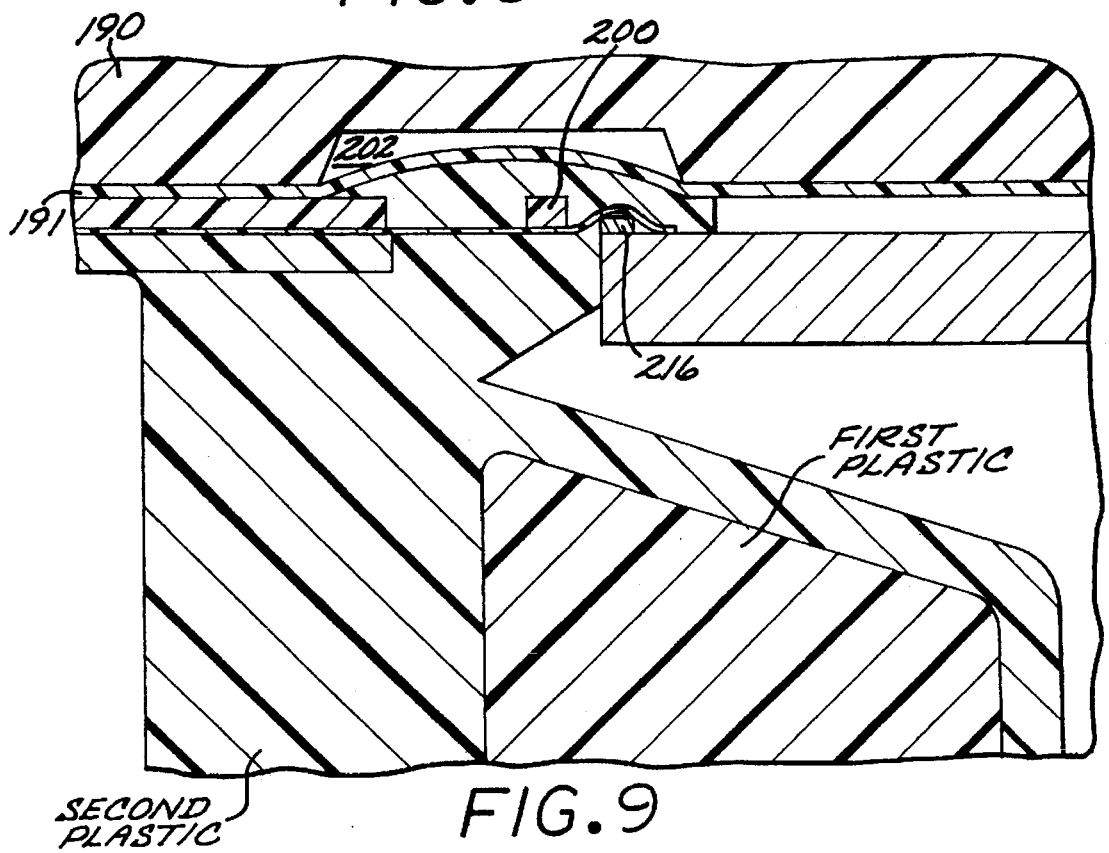
FIG. 9 is a view similar to FIG. 8 but taken after application of heat and pressure to the THA by the staker horn.

FIGS. 8 and 9 are partial cross-sectional views which illustrate this aspect of the invention as applied to an edge-fed printhead. In FIG. 8, the staker horn 190, scrim sheet 191 and the THA 14 are shown poised above the headland region 42, prior to application of heat and pressure; the THA is shown as resting on the ridge 192, with the staker horn 190 and scrim sheet 191 in turn disposed above the THA. In FIG. 9, the THA is shown in the bonded state, i.e., after application of heat and pressure by the staker horn 190, resulting in melting of the second plastic material forming the ridges 192. A first window 196 is 5 formed in the tape 18 to permit the conductor traces 19 to be bonded to the substrate 170. In one embodiment, the material forming the ridge 192 is melted and flows through this window 196 to encapsulate the traces 19. For some applications, a single window at each short edge of the substrate will be sufficient to provide adequate encapsulation. In the embodiment illustrated in FIGS. 8 and 9, a second window 198 is formed in the polymer tape 18 which is separated from the first window by a bridge element 200 comprising the tape 18, and above the ridge 192.

The staker horn 190 has a relieved area or cavity 202 formed therein, at a region disposed over the area of the printhead to be encapsulated. As the pressure and heat are applied to the raised ridges 192, the viscosity of the second plastic material lowers, with the result that the material from the ridges 192 flows and wets to and fills the second window 198. As heat and pressure are applied by the staker horn, the cavity 202 in the horn and the flexible scrim sheet 191 forms a mold into which the melted second plastic material from the ridge 192 flows, via the first window 198. An advantage of the flexible scrim sheet 191 is that it makes alignment of the staker horn with the THA somewhat less critical, since the scrim sheet also helps define the mold cavity into which the encapsulation melted material flows. The melted material flows over the bridge element 200 and into the first window 196 to cover and encapsulate the traces 19. This is shown in FIG. 9. This embodiment is useful since a gap G must be allowed for the TAB 18 to be placed on the headland region, due to part tolerances, yet the melted material must flow beyond the gap to encapsulate the traces 19. The second window 198 permits the melted material to flow yet, because the small bridge element 200 is between the two windows, the length of the cantilevered traces 19 does not violate typical TAB design rules.

Also shogun in FIGS. 8 and 9 is a dielectric hedgerow element 216, applied to the surface of the substrate 170 to facilitate bonding of the traces 19 to the substrate without undesired shorting of the traces to adjacent conductor elements.

The second material is molded as part of the fabrication process of the frame, and therefore due to the nature of plastics molding, the features 192 which are melted for use as the encapsulation can be sized very accurately, relative to the conventional encapsulation adhesive dispensing process. This is particularly true in that the adhesive bead is effectively formed with a molding process whereby the holes in the staker horn control the dimensions of the encapsulant bead. Thus, the invention provides improved yields in the assembly and encapsulation as compared to conventional encapsulation methods.

FIGS. 12 and 13 illustrate application of this aspect of the invention to a center-fed printhead configuration. FIG. 12 shows the staker horn 160 and scrim sheet 161 poised at the headland region, with the THA 14 resting on the compliant beams 156 formed of the second plastic material. Cavities 162 are formed in the staker horn above the open window areas 130 formed in the tape layer 18 to accommodate the substrate 140 and orifice plate 146. As heat and pressure are applied by the staker horn, the cavities and the flexible scrim sheet 161 permit the flow of the second plastic material in melted form from the beams 156 to flow up and fill the windows 130 and encapsulate the traces 19 connected to the printhead.

Figure 14:
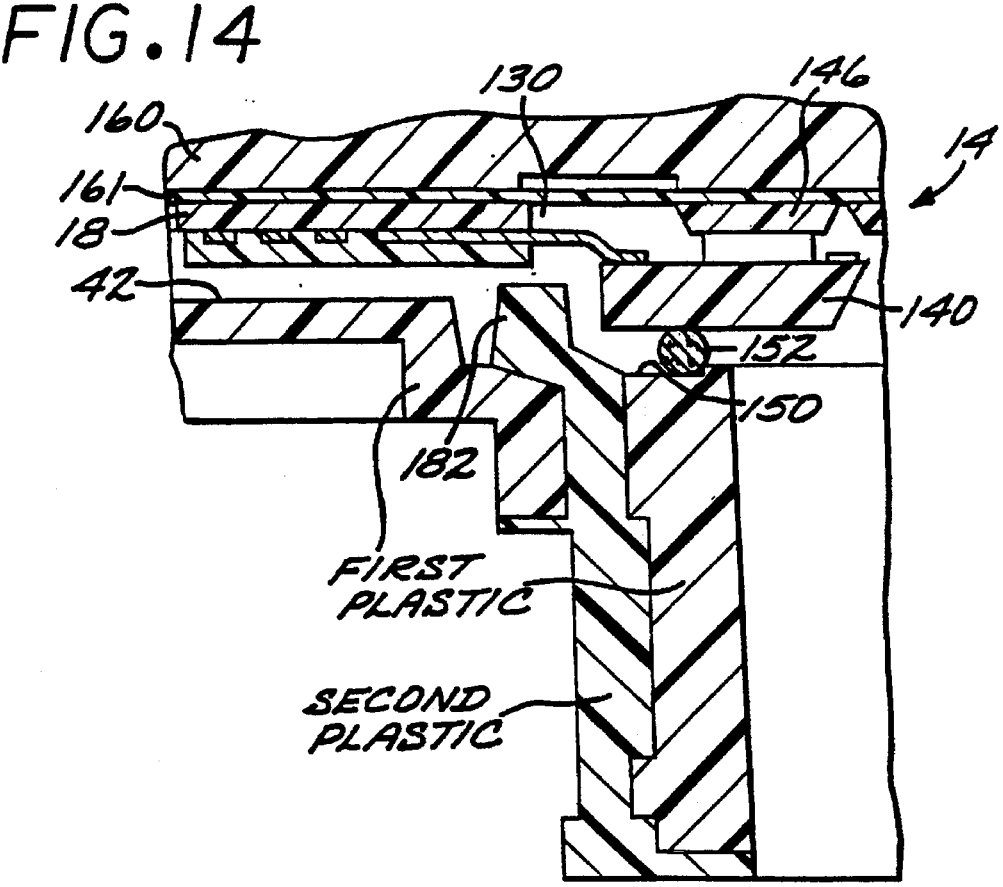
FIG. 14 is a partial cross-sectional view of a center-fed ink-jet printhead configuration, illustrating an aspect of the invention.
Figure 15:
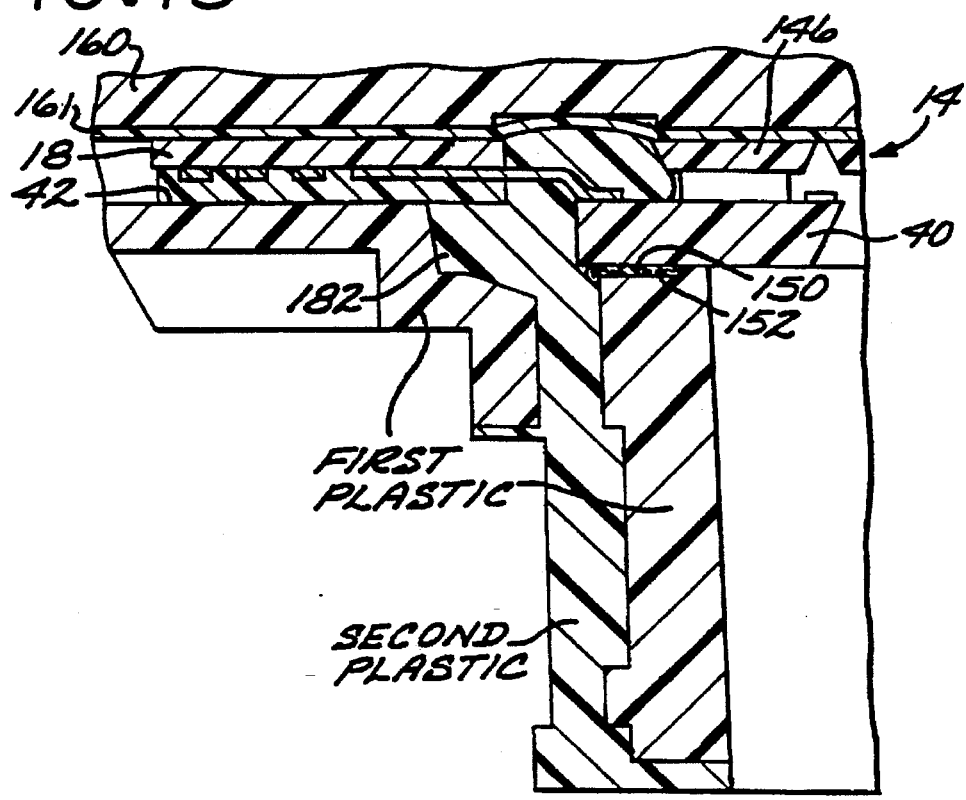
FIG. 15 is a partial cross-sectional view similar to FIG. 14, but taken after application of heat and pressure by the staker horn.

FIGS. 14 and 15 show an alternate embodiment of this aspect of the invention for the center-fed printhead configuration. In this embodiment, the second plastic material is molded to define the beam 182, but does not cover the headland region in the manner described above regarding FIG. 11. The beam 182 extends above the surface of the headland region, and provides material to be melted by application of heat and pressure to form the trace encapsulation. In this embodiment, the substrate 140 is secured to the first plastic material defining the standpipe 44 by an adhesive bead 152. Thus, the adhesive 152 is dispensed on the exterior facing surface of the beam 150 defined by the rigid first plastic material, and the substrate 140 carried by the tape 18 is placed over the headland region. A staker horn 160 and scrim sheet 161 is then placed over the THA 14, and applies heat and pressure thereto to melt the second plastic material forming the beam 182 and press the substrate 140 downwardly against the exterior surface of the beam 150. The result is shown in FIG. 15, where the second plastic material has melted and reflowed to encapsulate the traces 19, the substrate 140 has been urged against the upward facing surface of the beam 150 and has compressed the adhesive bead 152. In this case (FIG. 15), the cover layer is bonded directly to the first shot material 34.

Compliant Headland Design

As heretofore described, one type of ink-jet pen cartridges includes an edge fed die and orifice plate, wherein the ink feed channel to the nozzles on the orifice plate is defined by the pen frame in combination with a flexible interconnection circuit carrying the die and orifice plate and the die itself (FIG. 3A). As a pen is subjected to temperature extremes, the THA and pen frame expand and contract with temperature change. Typically, the CTE (coefficient of thermal expansion) of the pen frame is much higher than that of the THA. Therefore, as the pen is heated and cooled, the pen frame expands and contracts more than the THA; hence the THA is subjected to tensile and compressive stress. This stress leads to failures in the bond joint between the flexible circuit and the barrier layer and/or the bond joint between the flexible circuit 18 and the structural epoxy 152.

To solve this problem in accordance with this aspect of the invention, the THA 14 is heat staked to a compliant beam on the headland region 42. As the pen is subjected to temperature extremes, and the first plastic material expands or shrinks more than the Kapton tape 18, the mismatch in expansion coefficients between the first plastic material and the Kapton material is taken up by flexing of the compliant beam. This in turn reduces the stresses seen at the ink joint between the TAB circuit and the headland.

Another benefit to use of the compliant, stakable beam is that it can be staked quickly, with a relatively small amount of heat being transferred to the first plastic material. In a conventional technique for securing the THA to the headland, the THA is glued in place with a thermal set material which must be cured at 100 degrees C. for two minutes. The excess heat of the curing process raises the temperature of the first plastic material, causing the frame to expand. As the pen is removed from the fixture after completion of this conventional process and cooled, compressive stress is applied to the TAB circuit 18. The pen must typically be able to survive the temperature range of −40 degrees to +60 degrees C. without a delamination failure. However, in the conventional process, the pen is built at the high end of the temperature extreme and thus for most of its life near ambient, is subjected to the stresses induced at the initial build. With this invention, since the staking process can be performed quickly, e.g., on the order of two seconds or less, the first plastic material is essentially insulated from the staker horn, and thus the assembly has lower stress to begin with (nearly a factor of two less) than with the conventional process. Also it has been found that typical polyphenylene oxide tends to shift during the epoxy cure process. When this happens, additional stress is built into the assembly. With the staking process, less energy is transferred to the first plastic material. Thus, this source of added stress is eliminated.

FIGS. 5A and 5B illustrate this aspect of the invention on an edge-fed printhead configuration. As shown in FIG. 5A, the THA 14 is being placed over a section of the headland with a representative staker horn 190. The THA is separated from the horn by a scrim sheet 191 to prevent the melt from sticking to the horn. The compliant beam 182 protrudes from the headland region, and is fabricated of the elastomeric second plastic material. As heat and temperature are applied to the THA (FIG. 5B), it is heat staked to the second plastic material of the frame, and particularly to the compliant beam 182 adjacent the substrate 170. The staking of the THA to the cheek areas will tend to reduce the effect of the compliance, but there is still significant gain, as determined experimentally. However, if even less stress is required, a gap can be added between the compliant beam and the headland stake area to allow a region of the THA to flex, or to make the headland stake area a series of very thin compliant beams that will reduce the force required to displace the THA toward or away from the compliant beam 182.

Because this aspect of the invention allows the THA to be staked at a THA-to-body tooling fixture, and because the compliant beams 182 can be placed very close to the die, e.g., within 1 mm, the invention also eliminates the problem of THA hold down prior to the curing process necessary with the conventional adhesive process. In the conventional process, the THA needs to be tacked in place with a hot bar tacking process to control in-plane alignment prior to adhesive curing. During the curing, the head needs to be held down against stops to control the z-axis height. Finally an additional cheek staking operation is required afterwards. All of these localized staking operations tend to result in a less-flat THA and resultant built-in stresses. With this invention, the single staking operation results in a much more planar THA and hence less built-in stress.

FIGS. 12 and 13 illustrate the application of this aspect of the invention to center-fed printhead configurations. Here the substrate 140 is heat staked to the pedestal 158 and to the compliant beams 156, each of which is fabricated of the elastomeric second plastic material. As a result, the beams and pedestal flex to take up any differential movement between the first plastic material and the Kapton tape 18 due to temperature expansion coefficient differentials.

It is noted that the THA can be attached to the compliant beams by conventional adhesive, instead of by heat staking as has been described. This will still provide an advantage in the delamination problem, since the compliant beams will flex even with the adhesive attachment.

It is understood that the above-described embodiments are merely illustrative of the possible specific embodiments which may represent principles of the present invention. Other arrangements may readily be devised in accordance with these principles by those skilled in the art without departing from the scope and spirit of the invention. For example, while the invention has been described in the context of ink-jet pen cartridges having integral ink reservoirs, the invention is also applicable to ink-jet pens without integral ink reservoirs, e.g., pens receiving a supply of ink from a remotely located reservoir or which have detachable reservoirs.

What is claimed is:

1. A method of attaching a flexible interconnection circuit assembly to an ink-jet pen cartridge including a frame structure comprising a plastic frame member formed of a first plastic material defining a headland region, the headland region including a cheek area, the method comprising a sequence of the following steps:

molding a layer of a second plastic material which adheres to said plastic frame member and covers at least a portion of said headland region, wherein said second plastic material is exclusive of any material forming said flexible interconnection circuit assembly; and heat staking a surface of said interconnection structure to said second plastic material at said cheek area by application of heat and pressure.

2. The method of claim 1 wherein said flexible interconnection circuit assembly includes a cover layer which defines said surface of said interconnection surface, and wherein said second plastic material is heat staked to said cover layer.

3. The method of claim 2 wherein said cover layer comprises a third plastic material, and wherein during said heat staking operation, said second and said third plastic materials are melted at an interface therebetween.

4. The method of claim 3 wherein molecules of said melted second and said third plastic materials become mixed at said interface during said heat staking operation.

5. The method of claim 3 wherein said first material has a melting temperature, said second material has a melting temperature, said third material has a melting temperature, wherein said second and third material melting temperatures are well below said first material melting temperature, and wherein during said heat staking step, the temperatures of said second and third materials are elevated to above said respective melting temperatures thereof at said interface, and the temperature of said first plastic material remains below said first material melting temperature.

6. The method of claim 3 wherein said second plastic material is a polyolefin material, and said third plastic material is ethyl vinyl acetate.

7. The method of claim 1 further comprising the step of forming a groove in said first plastic material at said cheek area, and wherein said step of forming said layer of said second plastic material includes filling said groove with said second plastic material to assist in locking said layer in place on said headland region.

8. The method of claim 1 wherein said first plastic material has a melting temperature, said second plastic material has a melting temperature, wherein said second material melting temperature is lower than said first plastic material melting temperature, and wherein a heat range applied during said heat staking step is selected such that said first plastic material is not heated to its melting temperature during said heat staking operation, and said second plastic material is heated to its melting temperature during said heat staking step at an interface between said first and second plastic materials.

9. The method of claim 1 wherein said interconnection circuit includes a center-fed ink-jet printhead.

10. The method of claim 1 wherein said interconnection circuit includes an edge-fed ink-jet printhead.

11. The method of claim 1 wherein said heat staking step comprises heating a heat staking horn element, disposing said interconnection circuit between said horn element and said headland region, and pressing said interconnection circuit against said headland region by use of said horn element, thereby applying heat and pressure to an interface between said second plastic material and said surface of said interconnection circuit.

12. The method of claim 11 wherein said heat staking step further includes the step of disposing a scrim sheet layer between said horn element and said interconnection circuit prior to application of heat and pressure to said interface.

13. The method of claim 1 wherein said heat staking step includes ultrasonically applying heat to an interface between said second plastic material and said surface of said interconnection surface.

14. The method of claim 1 wherein said ink-jet cartridge further includes an ink reservoir mounted within said frame structure, and an ink channel extending between said reservoir and said headland region.

15. A method of attaching a flexible interconnection circuit assembly to an ink-jet pen cartridge including a frame structure comprising a plastic frame member formed of a first plastic material defining a headland region at a cartridge snout and a first side region adjacent the headland region, the headland region including a cheek area, the method comprising a sequence of the following steps:

molding a layer of a second plastic material which adheres to said plastic frame member and covers at least a portion of said headland region and a portion of said first side region of said snout, wherein said second plastic material is exclusive of any material forming said flexible interconnection circuit assembly; and heat staking a surface of said interconnection structure to said second plastic material at said cheek area and at said first side region by application of heat and pressure.

16. The method of claim 15 wherein said heat staking step includes:

bringing said surface of said interconnection structure into contact with said second plastic material at said cheek areas, and applying heat and pressure to heat stake a portion of said surface of said interconnection structure to said layer of said second plastic material at said cheek area;

wrapping a portion of said flexible interconnection structure against said side region; and applying heat and pressure to heat stake a portion of said surface of said interconnection structure to said layer of said second plastic material at said side region.

17. The method of claim 15 wherein said flexible interconnection circuit assembly includes a cover layer which defines said surface of said interconnection structure, and wherein said second plastic material is heat staked to said cover layer.

18. The method of claim 17 wherein said cover layer comprises a third plastic material, and wherein during said heat staking operation, said second and said third plastic materials are melted at an interface therebetween.

19. The method of claim 18 wherein molecules of said melted second and said third plastic materials become mixed at said interface during said heat staking operation.

20. The method of claim 18 wherein said first material has a melting temperature, said second material has a melting temperature, said third material has a melting temperature, wherein said second and third material melting temperatures are well below said first material melting temperature, and wherein during said heat staking step, the temperatures of said second and third materials are elevated to above said respective melting temperatures thereof at said interface, and the temperature of said first plastic material remains below said first material melting temperature.

21. The method of claim 18 wherein said second plastic material is a polyolefin material, and said third plastic material is ethyl vinyl acetate.

22. The method of claim 15 further comprising the step of forming a groove in said first plastic material at said cheek area, and wherein said step of forming said layer of said second plastic material includes filling said groove with said second plastic material to assist in locking said layer in place on said headland region.

23. The method of claim 15 wherein said first plastic material has a melting temperature, said second plastic material has a melting temperature, wherein said second material melting temperature is lower than said first plastic material melting temperature, and wherein a heat range applied during said heat staking step is selected such that said first plastic material is not heated to its melting temperature during said heat staking operation, and said second plastic material is heated to its melting temperature during said heat staking step at an interface between said first and second plastic materials.

24. The method of claim 15 wherein a second side region is defined adjacent said headland region on an opposing side from said first side region, wherein said step of forming a layer of said second plastic material includes forming a layer of said second plastic material which adheres to said first plastic material and covers a portion of said second side region, and wherein said step of heat staking said interconnection circuit includes heat staking said surface of said interconnection circuit to said second side region.

25. The method of claim 15 wherein said interconnection circuit includes a center-fed ink-jet printhead.

26. The method of claim 15 wherein said interconnection circuit includes an edge-fed ink-jet printhead.

27. The method of claim 15 wherein said heat staking step comprises heating a heat staking horn element, disposing said interconnection circuit between said horn element and said headland region, and pressing said interconnection circuit against said headland region by use of said horn element, thereby applying heat and pressure to an interface between said second plastic material and said surface of said interconnection circuit.

28. The method of claim 27 wherein said heat staking step further includes the step of disposing a scrim sheet layer between said horn element and said interconnection circuit prior to application of heat and pressure to said interface.

29. The method of claim 15 wherein said heat staking step includes ultrasonically applying heat to an interface between said second plastic material and said surface of said interconnection surface.

30. The method of claim 15 wherein said ink-jet cartridge further includes an ink reservoir mounted within said frame structure, and an ink channel extending between said reservoir and said headland region.

* * * * *